United States Patent
Yamagami et al.

(10) Patent No.: US 6,601,134 B1
(45) Date of Patent: Jul. 29, 2003

(54) MULTI-PROCESSOR TYPE STORAGE CONTROL APPARATUS FOR PERFORMING ACCESS CONTROL THROUGH SELECTOR

(75) Inventors: Kenji Yamagami, Sagamihara (JP); Kazuhisa Fujimoto, Kodaira (JP); Yasuo Kurosu, Yokosuka (JP); Hisao Honma, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/298,967

(22) Filed: Apr. 26, 1999

(30) Foreign Application Priority Data

Apr. 27, 1998 (JP) .......................................... 10-132712

(51) Int. Cl.[7] .......................... G06F 12/00; G06F 13/00
(52) U.S. Cl. ...................... 711/111; 711/112; 711/113; 711/118
(58) Field of Search ........................ 711/111, 112, 113, 711/114, 118; 714/519, 819, 820, 821

(56) References Cited

U.S. PATENT DOCUMENTS

| | | | | |
|---|---|---|---|---|
| 4,422,142 A | * | 12/1983 | Inaba et al. ................ | 710/128 |
| 4,698,753 A | * | 10/1987 | Hubbins et al. ........... | 709/209 |
| 5,475,859 A | * | 12/1995 | Kamabayashi et al. ..... | 711/118 |
| 5,771,367 A | * | 6/1998 | Beardsley et al. .......... | 711/113 |
| 5,860,110 A | * | 1/1999 | Fukui et al. ................ | 711/141 |
| 5,974,058 A | * | 10/1999 | Burns et al. ................ | 370/538 |
| 6,065,096 A | * | 5/2000 | Day et al. ................... | 711/114 |
| 6,134,624 A | * | 10/2000 | Burns et al. ................ | 710/131 |

OTHER PUBLICATIONS

"HITAC H8538–C3 Type Disc Control Apparatus", 1985, p. 5.
"HITAC A6591 Type Disc Control Apparatus", 1997, p. 4.

* cited by examiner

*Primary Examiner*—Matthew Kim
*Assistant Examiner*—Yamir Encarnacion
(74) *Attorney, Agent, or Firm*—Mattingly, Stanger & Malur, P.C.

(57) ABSTRACT

A storage control apparatus is coupled to a central processing unit (CPU) and a storage unit to control input/output of data between the CPU and the storage unit. The storage control apparatus has at least two processors coupled to the CPU and the storage unit, a cache memory (CM) unit for temporarily storing data of the storage unit, a shared memory (SM) unit for storing information concerning control of the CM unit and the storage unit, and a selector coupled to the at least two processors, the CM unit and the SM unit through access paths to selectively apply access requests from the at least two processors to the CM unit and the SM unit.

6 Claims, 20 Drawing Sheets

MULTI-PROCESSOR TYPE STORAGE CONTROL APPARATUS FOR PERFORMING ACCESS CONTROL THROUGH SELECTOR

BACKGROUND OF THE INVENTION

The present invention relates to a multi-processor system having a shared memory unit and more particularly to a multi-processor type storage control apparatus.

In recent storage systems, a system of the type having multi-processor architecture has been employed principally with the aim of obtaining higher performance.

For example, in a prior art shown in "HITAC H8538-C3 type disc control apparatus", p5, 1985, the apparatus has storage directors each of which controls data transfer between a central processing unit (CPU) and a storage unit, and a cache memory that temporally stores data of the storage units. The two or more storage directors are connected to the cache memory and each of the storage directors has an access path to the cache memory. Such an arrangement is called "star connection". There are processors running micro programs that control data transmission and related hardware in the storage director. The apparatus also has a shared memory which stores information, such as cache and disc management data, with-which the processors work consistently. The storage directors and the shared memory are connected in a similar manner to the cache memory through different access paths.

On the other hand, in another prior art shown in "HITAC A6591 type disc control apparatus", p4, 1997, the control apparatus has a plurality of processors on the host side, a plurality of processors on the storage unit side, a cache memory unit and a shared memory unit. Each of the processors is coupled to the shared memory unit through a control bus and each of the processors is coupled to the cache memory unit through a data bus.

In the above prior arts, the shared memory unit has a dual structure of shared memory sections with the aim of securing the reliability, so that even when one of the shared memory sections is blocked, normal operation of the system can be ensured. In the conventional system, for the purpose of maintaining the dual state of the shared memory unit, a method is employed in which when write access to the shared memory unit occurs, circuits of both the shared memory sections receive the access and at the same time, update a designated address.

On the other hand, in the former prior art, such control as above is not carried out and when there occurs updating, addresses on both the shared memory sections are updated sequentially in accordance with a program operated by the processor.

SUMMARY OF THE INVENTION

To meet a need for high performance required for the storage apparatus system, the control unit is increased in scale and components are increased in speed so that for example, the number of processors may be increased, the capacity of the cache memory unit may be increased, high-performance processors may be employed, the width of internal buses may be expanded and the bus transfer capability may be improved.

In the latter prior art disclosed in "HITAC A6591 type disc control apparatus", however, the transfer capability of the internal paths has been liable to encounter difficulties in following an increase in scale of the system and improvements in performance.

Especially, the control path has a small transfer amount per transfer operation, with the result that most of occupation time is used for protocol overhead and the transfer capability of the path cannot fulfil itself.

Accordingly, in order to obtain high memory access performance, it is conceivable to couple the processor and the memory unit in a star connecting fashion as in the former prior art system disclosed in the "HITAC H-8538-C3 type disc control apparatus".

However, the number of access paths for coupling the shared memory unit and the cache memory unit increases in proportion to an increase in the number of carried processors.

The number of pins in an existing LSI amounts up to a maximum of about 600.

On the other hand, on assumption that the width of access paths inclusive of control line is about 20 bits and the number of processors is 64, input lines of 1280 bits in total are laid to each of the shared memory unit and the cache memory unit, giving rise to a shortage of the number of pins in the LSI.

Further, since the size of a package is limited, there is an upper limit of the number of connectors on the package, making it impossible to lay the input lines of 1280 bits.

Accordingly, a first object of the present invention is to provide a storage control apparatus having an internal construction which can avoid a shortage of the number of pins and that of the number of connectors in an LSI and can secure necessarily sufficient performance.

On the other hand, in the shared memory unit having a dual structure, the sequence of access to dual sections by the individual processors must be maintained.

This problem will be described by way of example.

Incidentally, as will be well known in the art, access to the cache memory unit is carried out by using management information in the shared memory unit. More particularly, management information for each segment of the cache memory unit (information indicative of use/nonuse of each segment and information indicative of locking/unlocking of each segment) is stored in the shared memory unit. When the processor accesses the cache memory unit, it decides from the management information in the shared memory unit whether or not a segment to be accessed is in use. In case the segment is in nonuse, the processor accesses that segment of the cache memory unit. Through this, a plurality of processors are prevented from writing/reading to/from the cache memory unit simultaneously.

Thus, it is now assumed that for example, processors a and b update the contents of the shared memory unit substantially simultaneously.

If the contents of a section A of the shared memory unit is first updated by the processor a and the contents of a section B of the shared memory unit is updated by the processor b, followed by subsequent updating of the contents of the section A by the processor b and subsequent updating of the contents of the section B by the processor a, the shared memory unit has the ultimate contents including the contents of section A which is updated by the processor b and the contents of section B which is updated by the processor a, thus indicating that states of both the sections do not coincide with each other.

In the aforementioned "HITAC H-6581-C3 disc type control apparatus", a method is proposed as a means for securing the access sequence, according to which the individual processors are exclusively ORed programmably and thereafter, the same addresses in both the shared memory sections are updated sequentially.

In the above method, however, the memory unit is once locked and then updated, raising a problem from the standpoint of performance.

Accordingly, a second object of the present invention is to maintain the dual state of the two shared memory sections.

According to an aspect of the present invention, a storage control apparatus coupled to a central processing unit and a storage unit to control input/output of data between the central processing unit and the storage unit, comprises at least two processors coupled to the central processing unit and the storage unit, a cache memory unit for temporarily storing data of the storage unit, a shared memory unit for storing information concerning control of the cache memory unit and the storage unit, and a selector coupled to each of the at least two processors, the cache memory unit and the shared memory unit through access paths to selectively apply access requests from the at least two processors to the cache memory unit and the shared memory unit.

With this construction, the total number of access paths for coupling the selector and the shared memory unit or the total number of access paths for coupling the selector and the cache memory unit can be smaller than the total number of access paths for coupling the at least two processors and the selector, thereby reducing the number of paths (pins) laid to each memory unit. A similar effect can also be attained when a single memory unit is used to serve as both a cache memory unit and a shared memory unit.

According to an embodiment of the present invention, the shared memory unit includes paired two shared memory sections each coupled to the selector, the two shared memory sections are coupled to each other by an inter-shared memory path, the selector applies an access request from one of the at least two processors to one of the two shared memory sections, the one shared memory section responds to the applied access request to perform an access process and sends a command to the other of the two shared memory sections, and the other shared memory section responds to the command to perform an access process. With this construction, by making a read/write access request to one of the two shared memory sections through the selector, the read/write processes for the two shared memory sections can be carried out simultaneously.

According to another embodiment of the present invention, the cache memory unit has a dual structure of first and second cache memory sections, the processors send access requests to the selector, and the selector responds to the access requests to access the two cache memory sections. With this construction, in accordance with the access requests made by the processors through one operation, the two cache memory sections can be accessed.

According to still another embodiment, the cache memory unit has a dual structure of first and second cache memory sections, the processors send to the selector commands for designating data copying between the first and second cache memory sections, and the selector responds to the commands to perform the data copying between the first and second cache memory sections. With this construction, the data copying between the two cache memory sections can be effected by one commanding operation from the processors.

DETAILED DESCRIPTION OF THE EMBODIMENTS

Embodiments of a storage control apparatus according to the present invention will now be described with reference to the accompanying drawings.

Figure 1:
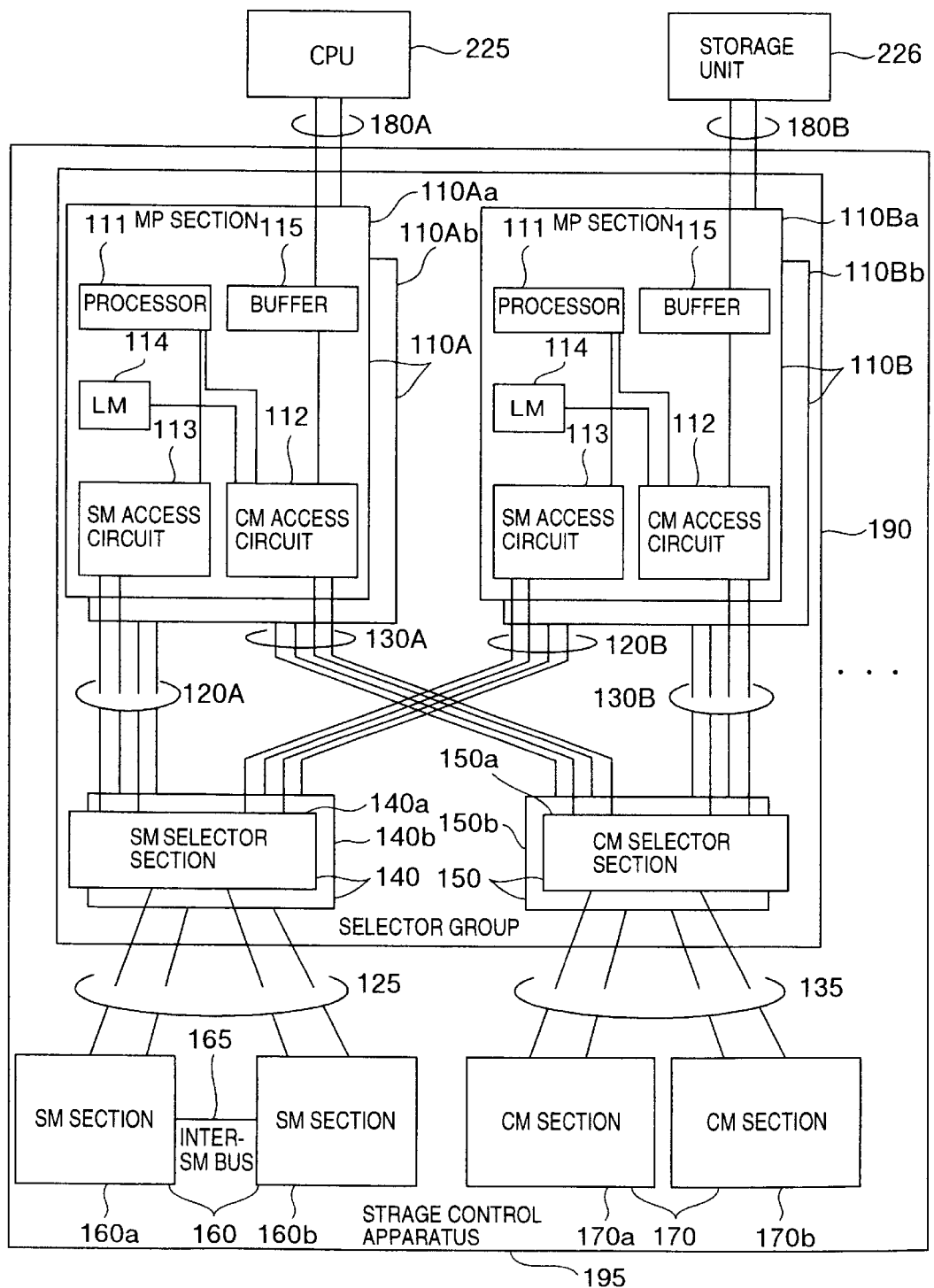
FIG. 1 is a block diagram showing an embodiment of typical construction of a storage control apparatus according to the present invention.

Referring to FIG. 1, there is illustrated an embodiment of typical construction of the storage control apparatus according to the invention.

The storage control apparatus, as designated by reference numeral 195, has at least two microprocessor (MP) units 110A and 110B, a shared memory (SM) selector 140, a cache memory (CM) selector 150, a SM unit 160, and a CM unit 170.

In this example, the MP unit 110A has a dual structure of MP sections 110A$a$ and 110A$b$ and the MP unit 110B also has a dual structure of MP sections 110B$a$ and 110B$b$. Similarly, the SM selector 140 has a dual structure of SM selector sections 140$a$ and 140$b$ and the CM selector 150 also has a dual structure of CM selector sections 150$a$ and 150$b$. Further, the SM unit 160 has a dual structure of SM sections 160$a$ and 160$b$ and the CM unit 170 also has a dual structure of CM sections 170$a$ and 170$b$.

Each of the MP sections 110Aa and 110Ab is coupled to a central processing unit (CPU) 225 or a storage unit 226 and in this example, to the CPU 225 by a path 180A which is, for example, a SCSI path. On the other hand, each of the MP sections 110Ba and 110Bb is coupled to the CPU 225 or the storage unit 226 and in this example, to the storage unit 226 by a path 180B which is also, for example, a SCSI path.

Each of the MP sections 110Aa and 110Ab is coupled to the respective SM selector sections 140a and 140b through access paths 120A and is also coupled to the respective CM selector sections 150a and 150b through access paths 130A. Similarly, each of the MP sections 110Ba and 110Bb is coupled to the respective SM selector sections 140a and 140b through access paths 120B and is also coupled to the respective CM selector sections 150a and 150b through access paths 130B.

Each of the SM selector sections 140a and 140b is coupled to the respective SM sections 160a and 160b through access paths 125. Similarly, each of the CM selector sections 150a and 150b is coupled to the respective CM sections 170a and 170b through access paths 135.

Each of the MP sections 110Aa, 110Ab, 110Ba and 110Bb includes one or more processors (MP's) 111, a CM access circuit 112 and a SM access circuit 113.

The MP 111, CM access circuit 112 and SM access circuit 113 in each of the MP sections 110Aa, 110Ab, 110Ba and 110Bb function as will be described below.

The MP 111 in each of the MP sections 110Aa and 110Ab executes data transfer between the CPU 225 and each of the SM sections 160a and 160b by way of each of the SM selector sections 140a and 140b and also executes data transfer between the CPU 225 and each of the CM sections 170a and 170b by way of each of the CM selector sections 150a and 150b.

Similarly, the MP 111 in each of the MP sections 110Ba and 110Bb executes data transfer between the storage unit 226 and each of the SM sections 160a and 160b by way of each of the SM selector sections 140a and 140b and also executes data transfer between the storage unit 226 and each of the CM sections 170a and 170b by way of each of the CM selector sections 150a and 150b.

The CM access circuit 112 in each of the MP sections 110Aa and 110Ab is a dynamic memory access (DMA) circuit which is coupled to the paths 130A to execute, in response to a request from the MP 111, data transfer between each of the CM sections 170a and 170b and the CPU 225 by way of the paths 130A, the paths 135 and each of the CM selector sections 150a and 150b. Similarly, the CM access circuit 112 in each of the MP sections 110Ba and 110Bb is a DMA circuit which is coupled to the paths 130B to execute, in response to a request from the MP 111, data transfer between each of the CM sections 170a and 170b and the storage unit 226 by way of the paths 130B, the paths 135 and each of the CM selector sections 150a and 150b.

A buffer 115 in each MP section 110Aa or 110Ab is coupled to the CPU 225 through the path 180A and is used to temporarily store data in response to a command from the CM access circuit 112. Similarly, a buffer 115 in each MP section 110Ba or 110Bb is coupled to the storage unit 226 through the path 180B and is used to temporarily store data in response to a command from the CM access circuit 112.

A local memory (LM) 114 connected to the CM access circuit 112 is used as a memory which is used for work by the processor or for storage of read data and write data.

The SM access circuit 113 in each of the MP sections 110Aa and 110Ab is coupled to the paths 120A and responds to a request from the MP 111 to execute data transfer from each of the SM sections 160a and 160b to the MP 111 or data transfer from the MP 111 to each of the SM sections 160a and 160b through the paths 120A, each of the SM selector sections 140a and 140b and the path 125. Similarly, the SM access circuit 113 in each of the MP sections 110Ba and 110Bb is coupled to the paths 120B and responds to a request from the MP 111 to execute data transfer from each of the SM sections 160a and 160b to the MP 111 or data transfer from the MP 111 to each of the SM sections 160a and 160b through the paths 120B, each of the SM selector sections 140a and 140b and the path 125.

Each of the SM selector sections 140a and 140b functions to select one of requests for access to the SM sections 160a and 160b, which are delivered from the respective MP sections 110Aa, 110Ab, 110Ba and 110Bb through the paths 120A and paths 120B, so as to execute access to either the corresponding SM section 160a or 160b in response to the selected access request.

Each of the CM selector sections 150a and 150b functions to select one of requests for access to the CM sections 170a and 170b, which are delivered from the respective MP units 110Aa, 110Ab, 110Ba and 110Bb through the paths 130A and 130B, so as to execute access to either the corresponding CM section 170a or 170b in response to the selected access request.

In the present embodiment, the SM selector is constructed separately from the CM selector but obviously, apart from the separate construction, a single selector may be so constructed as to serve both as a SM selector and a CM selector.

The SM unit 160 is adapted to store control information such as cache management information and system management information and includes the two SM sections 160a and 160b which are paired.

Data stored in the SM unit 160 is dual for the paired SM sections so that the same data may be stored at addresses which are the same for the paired SM sections.

Accordingly, even in the event that one of the SM sections 160a and 160b is blocked up, no system down results.

The duality of the stored data can be realized by coupling the SM sections 160a and 160b through an inter-SM path 165.

Figure 18:
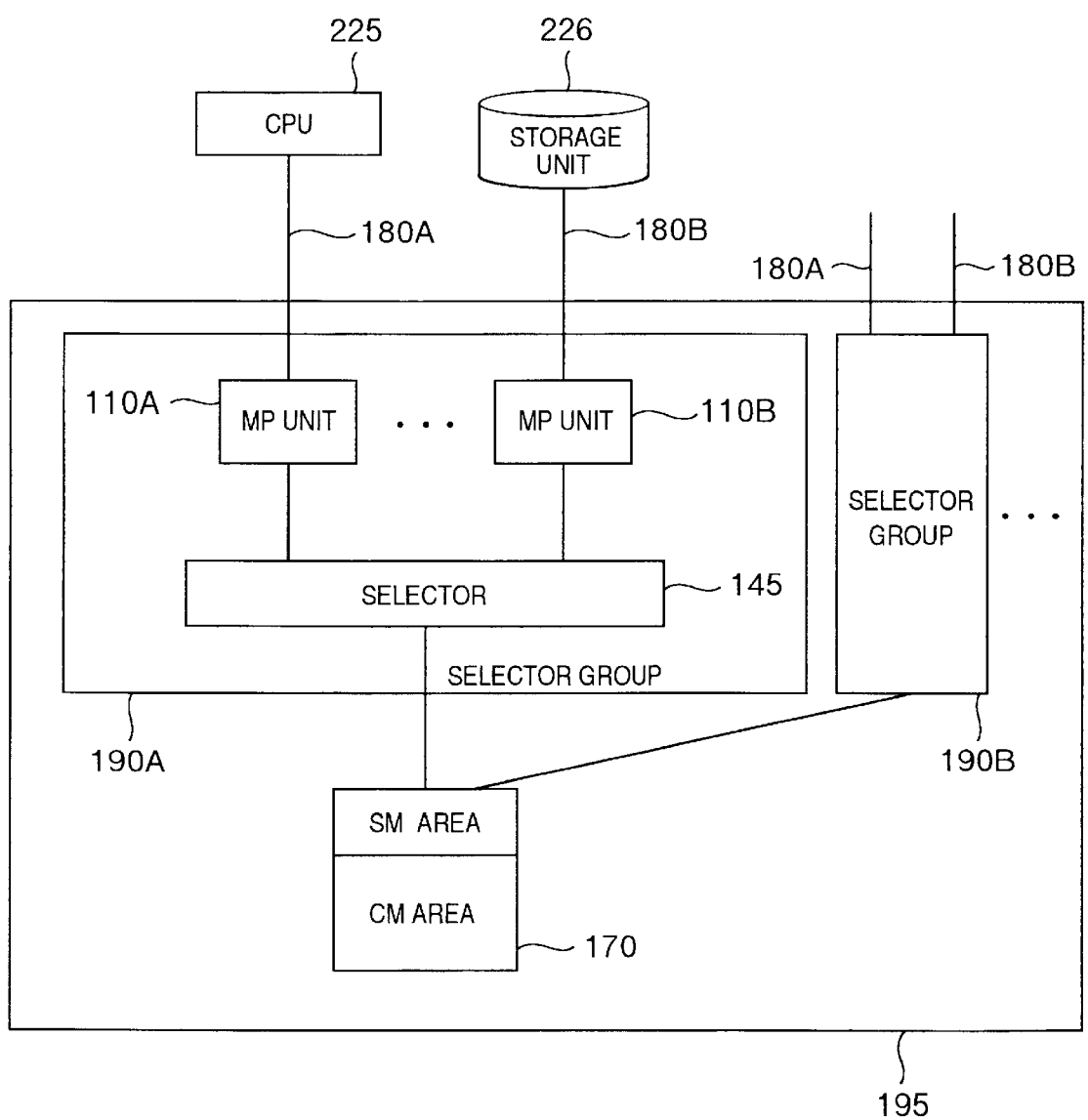
FIG. 18 is a block diagram showing another embodiment of basic construction of the storage control apparatus according to the invention.

In the present embodiment, the SM unit 160 and CM unit 170 are described as being memory modules which are independent from each other but structurally, it is conceivable that part of the CM unit 170 is used as a SM unit 160 (see FIG. 18).

On the other hand, the CM unit 170 is a memory unit adapted to temporarily store data which prevails on the storage unit. Write data from the CPU (host) which has already been written in the CM unit 170 but has not been written in the storage unit yet (that is, dirty data) is stored in the dual form in the two CM sections 170a and 170b.

The duality in the CM unit 170 differs from that in the SM unit 160 in that the same data is not always stored at cache addresses which are the same for the CM sections 170a and 170b.

Management information of the CM unit 170 is stored in the SM unit 160 and the duality of the CM unit 170 can be realized by causing the MP 111 to first access the SM unit 160 so as to secure data storage areas on the CM sections 170a and 170b and to write write data in these areas.

Accordingly, such a mechanism as the inter-SM access path 165 is unneeded between the CM sections 170a and 170b.

Each of the MP sections 110A*a*, 110A*b*, 110B*a* and 110B*b* is coupled to the two different SM selector sections 140*a* and 140*b* by the two SM access paths 120A or 120B and is also coupled to the two different CM selector sections 150*a* and 150*b* by the two CM access paths 130A or 130B.

Thus, each of the SM selector sections 140*a* and 140*b* is coupled with the four MP sections 110A*a*, 110A*b*, 110B*a* and 110B*b* and similarly each of the CM selector sections 150*a* and 150*b* is coupled with the four MP sections 110A*a*, 110A*b*, 110B*a* and 110B*b*.

Each of the SM selector sections 140*a* and 140*b* is coupled to each of the SM sections 160*a* and 160*b* by the single SM access path 125 and similarly, each of the CM selector sections 150*a* and 150*b* is coupled to each of the CM sections 170*a* and 170*b* by the single CM access path 135.

In this manner, the four MP sections 110A*a*, 110A*b*, 110B*a* and 110B*b*, two SM selector sections 140*a* and 140*b* and two CM selector sections 150*a* and 150*b* form one group which will be called hereinafter a selector group 190.

The control apparatus has one or more selector groups 190. In the example of FIG. 1, only one selector group is illustrated.

The number of MP units, SM selectors, CM selectors, CM units and SM units has been exemplified hereinbefore for mere explanation and it is not limitative.

Importantly, the number of the MP units 110 is made to be smaller than that of the SM selectors 140 in the selector group 190, thereby ensuring that the number of the SM access path 125 for coupling the SM selector 140 and the SM unit 160 can be smaller than that of the SM access paths 120 for coupling the MP unit 110 and the SM selector 140 and a shortage of the number of pins of a LSI carried on the SM unit 160 and a shortage of the number of connectors of a package of the SM unit 160 can be eliminated.

This holds true for the CM unit 170.

For example, when two independent SM access paths 120 (of which one is for alternate path) extending from 32 MP sections are coupled directly to each of the SM sections 160*a* and 160*b*, the total number of the SM access paths 120 coupled to the SM sections 160*a* and 160*b* amounts up to 32 (MP sections)×2(paths)=64.

On the assumption that each of the SM access paths 120 has a width of 16 bits, the SM unit 160 requires pins of 1024 bits but at present, a LSI having the number of pins as above is not available.

On the other hand, according to the present embodiment, 8 selector groups 190 are provided for 32 MP sections and the number of the SM access paths 120 coupling to each of the SM sections 160*a* and 160*b* is reduced to 8 (selector groups)×2 (SM selector sections)=16, with the result that the number of pins amounting up to 256 suffices.

Next, a first embodiment of access to the SM unit will be described.

Referring to FIGS. 1 to 6, the procedure for SM access will first be described. In the following description, as an example will be described in which the MP section 110A*a* accesses the SM unit 160 through the SM selector section 140*a*.

Figure 2:
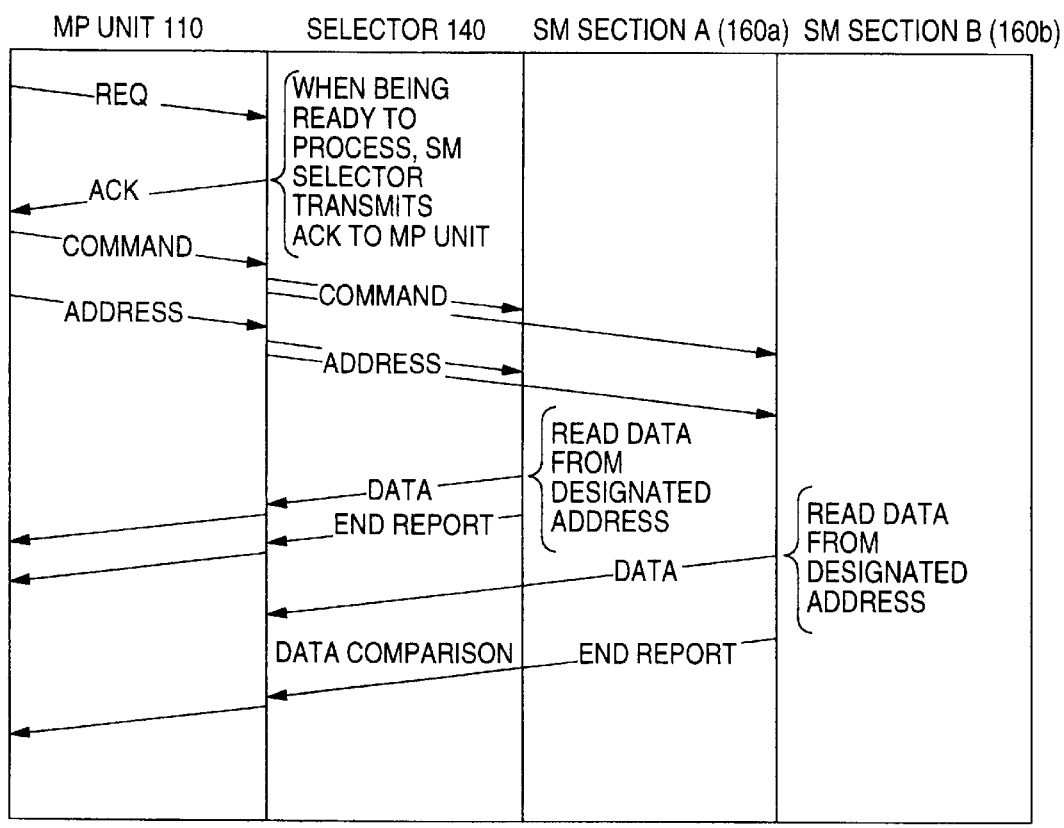
FIG. 2 is a diagram showing a first embodiment of the sequence of access to a shared memory (SM) unit according to the invention.

An example of the sequence of access to the SM unit 160 in the present embodiment is shown in FIG. 2.

The MP 111 transfers to the SM access circuit 113 an address of SM unit 160 (SM sections 160*a* and/or 160*b*) to be accessed, an address of LM 114 at which data is expected to be stored in case of read operation and an address of LM 114 at which write data has been stored in case of write operation.

When receiving a request for read access to the SM unit from the MP 111, the SM access circuit 113 transmits a REQ signal to the SM selector section 140*a* and waits until an ACK signal is returned from the SM selector section 140*a*. After receiving the ACK signal, the MP 111 transmits a read command and a read address.

The SM selector section 140*a* selects one of SM read access requests delivered out of the plurality of MP sections and returns the ACK signal to an originator MP section (here, MP section 110A*a*) which has transmitted the selected access request.

When subsequently receiving the command and address from the MP section 110A*a*, the SM access circuit 113 transmits the command and access to the SM sections 160*a* and 160*b* in case of dual access.

When the SM unit 160 receives the command and address, it reads data from that address, transfers the read data to the SM selector section 140*a* and then transmits an end report to the SM selector section 140*a*.

When receiving the initial read data and the end report from the SM section 160*a* or 160*b*, the SM selector section 140*a* transmits that data and the end report to the MP section 110A*a*.

At that time, the read data is temporarily stored in a buffer of the SM selector section 140*a*.

When the SM selector section 140*a* subsequently receives another read data from the SM section 160*a* or 160*b*, it compares the newly received read data with the read data which has been stored in the buffer to confirm coincidence.

Thereafter, the SM selector section transfers a received end report to the MP section 110A*a*, thereby completing the process. When the SM access circuit 113 receives the read data, it stores that data at the address of LM 114 which has been designated by the MP 111.

Thereafter, the MP section 110A*a* receives the aforementioned two end reports, thereby completing the process.

In case of the write process, the procedure proceeds similarly, so that the SM access circuit 113 transmits write data following a command and an address.

The SM selector 140 transfers the command, address and write data to the SM sections 160*a* and 160*b*, which store the write data at the designated address and then makes an end report.

Figure 3:
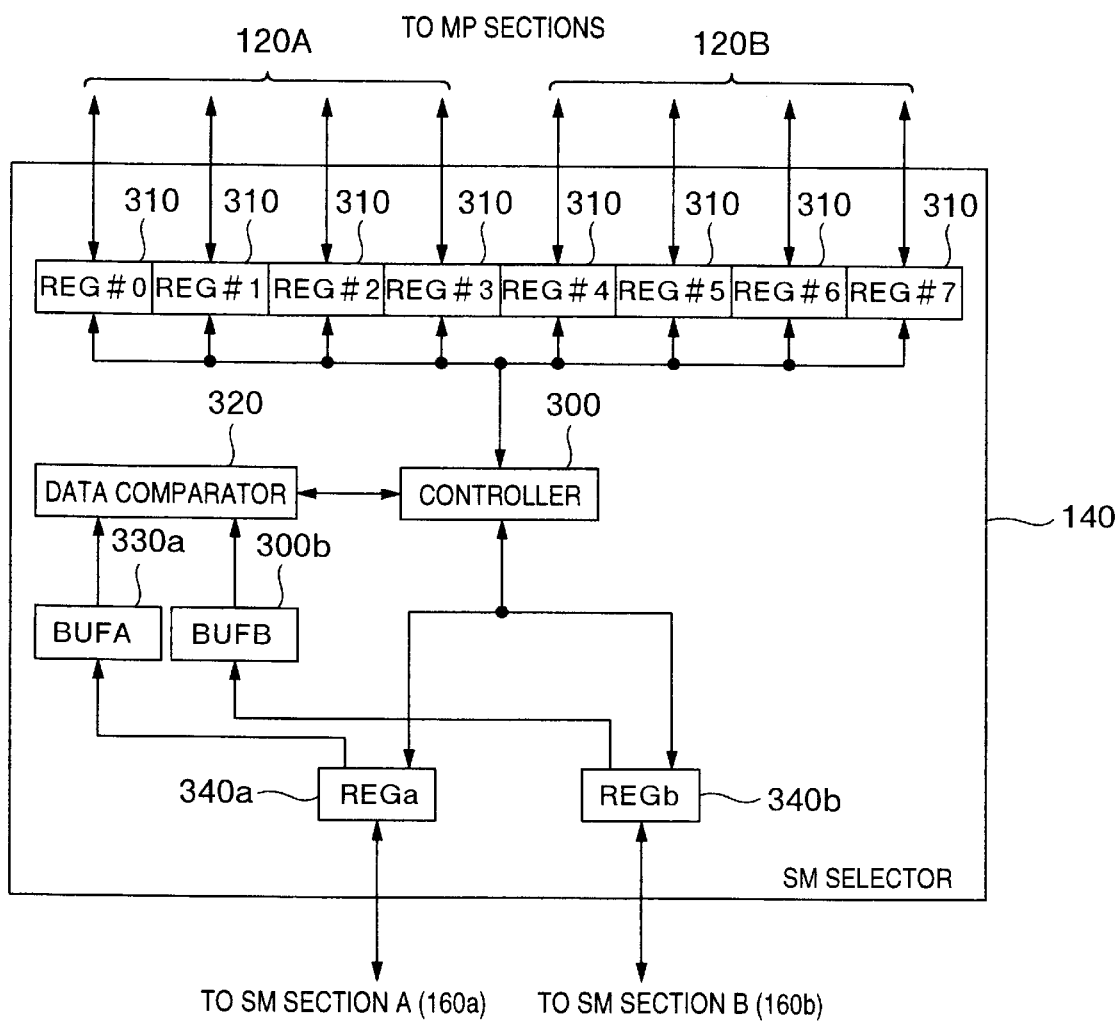
FIG. 3 is a circuit diagram showing an embodiment of construction of a SM selector shown in FIG. 1.

Referring now to FIG. 3, there is illustrated an example of internal construction of each of the SM selector sections 140*a* and 140*b*.

Registers 310 are provided in association with the respective SM access paths 120A and 120B through which each of the MP sections 110A*a*, 110A*b*, 110B*a* and 110B*b* is coupled to each of the SM selector sections 140*a* and 140*b*, and a controller 300 can transmit/receive information to/from the respective MP sections by reading/writing the respective registers 310. Since the 8 SM access paths 120 are provided in association with the 4 MP sections in FIG. 1, there are provided 8 registers 310 corresponding to the individual SM access paths in FIG. 3.

On the other hand, registers 340*a* and 340*b* are provided in correspondence to the respective SM access paths 125 through which the respective SM sections units 160*a* and 160*b* are coupled to the SM selector 140 and communication with the SM unit 160 can be ensured by reading/writing the registers 340*a* and 340*b*.

Data read out of the SM section 160*a* or 160*b* can be transferred to the MP section which has made the access request through the corresponding register 310 and at the same time can be stored in corresponding one of buffers 330a and 330b.

Then, after data are read out of the two SM sections 160a and 160b, coincidence of the data, that is, duality is checked by means of a data comparator 320.

The controller 300 functions to select and execute one of access requests delivered out of the respective MP sections 110Aa, 110Ab, 110Ba and 110Bb and to control the data comparator 320.

Figure 4:
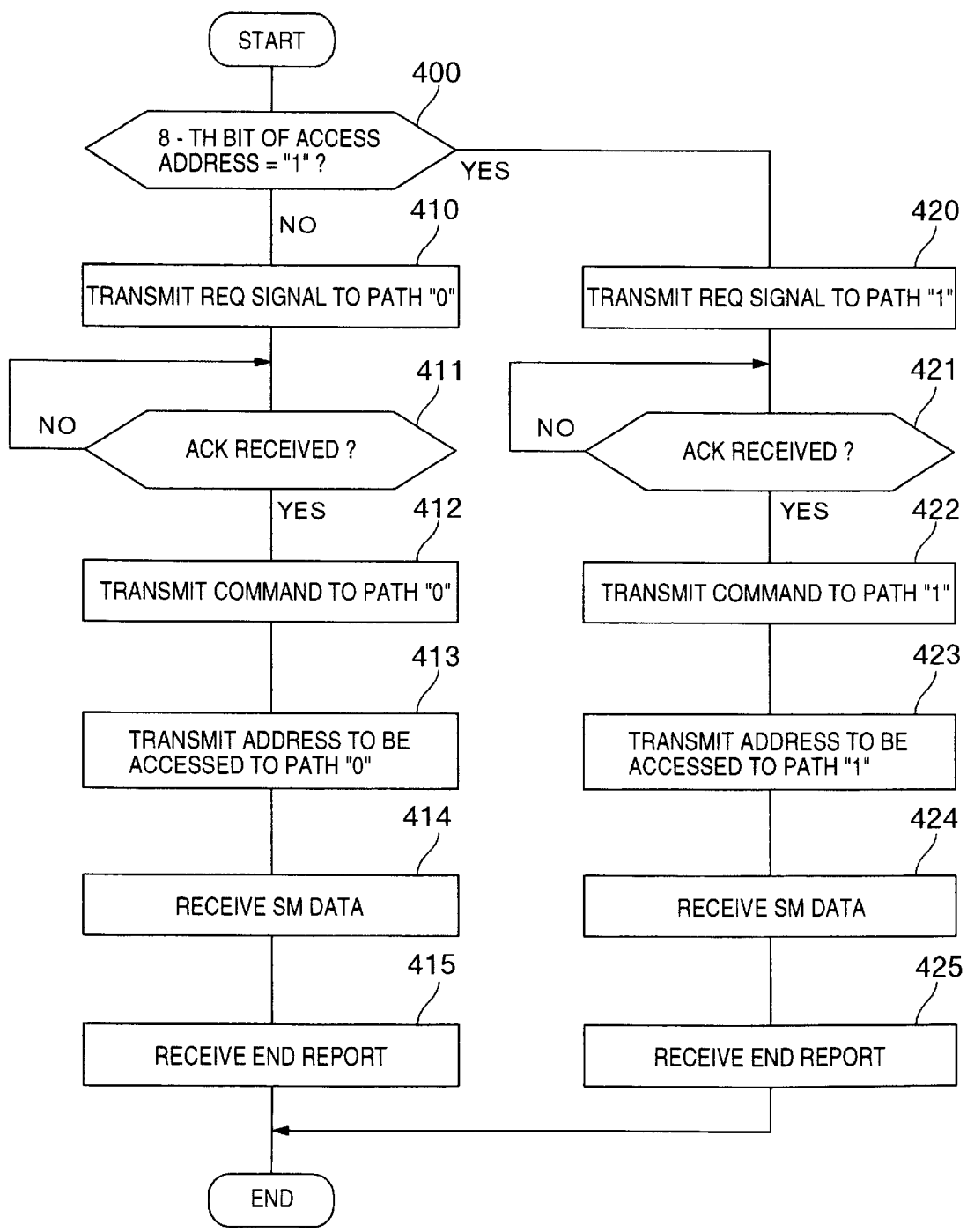
FIG. 4 is a flow chart showing the operation of a SM access circuit in FIG. 1.

Referring to FIG. 4, there is illustrated a flow chart of the process in the SM access circuit 113 of each MP section.

When the SM access circuit 113 receives a SM access request from a MP 111, it is checked in step 400 whether, for example, the eighth bit of an address of the SM unit 160 is "0" and if "0", the SM selector section 140a is selected in step 410 and the request signal is transmitted to the SM selector section 140a.

If the eighth bit is "1", the SM selector section 140b is selected in step 420 and the request signal is transmitted to the SM selector section 140b.

Since each MP section has the SM access paths 120 (120A, 120B; paths "0", "1") directed to the respective two SM selector sections 140a and 140b, it is efficient that the two paths are distributed in accordance with loads. Accordingly, in the present embodiment, the address on the SM access path is switched from an address for the SM selector section 140a to that for the SM selector section 140b or vice versa, for example, every 128 bytes.

Therefore, by consulting the 8□th bit of the access address, it can be determined which SM selector section is to be selected.

Generally, the access path is selected by consulting the n-th bit and switching between the SM selector sections 140a and 140b is carried out every $2^{(n-1)}$ bytes.

The value of n may be settled by examining the SM access pattern in the system.

Thus, in the event that one of the selector sections 140a and 140b becomes faulty, the faulty selector is made to be unusable. In this case, the step 400 is skipped to permit the request signal to be transmitted to a normal selector section.

When an ACK signal is returned from the selected SM selector section 140a or 140b in response to the transmitted REQ signal in step 411 or 421, a command and an access address are transmitted to the selected SM selector section 140a or 140b in steps 412 and 413 or steps 422 and 423.

In case the access is for reading, data is subsequently received through the selected SM selector in step 414 or 424 and the data is stored at an address of LM 114 designated by the MP.

In case the access is for writing, following the steps 413 and 414 or the steps 423 and 424, write data is transmitted from an address of LM 114 designated by the MP 111 to the SM unit 160 through the selected SM selector section.

Finally, when the SM access circuit 113 receives an end report from the SM section 160a and that from the SM section 160b through the selected SM selector section 140a or 140b in step 415, the process is completed.

The reasons why the interchange of REQ and ACK signals is needed in the steps 410 and 411 or steps 420 and 421 will now be described.

The SM selector 140 sequentially executes access requests from the plurality of MP's as will be detailed later and therefore, it is forced to wait when the access requests interfere.

Accordingly, the SM access circuit 113 first transmits a request signal and then starts processing when an ACK signal responsive to the request signal is returned from the SM selector.

Command data transmitted from the SM access circuit 113 to the SM selector 140 includes information indicative of either read or write, a flag indicative of either dual access or single access and information indicating which one of the SM sections 160a and 160b is to be accessed in case of single access.

Figure 5:
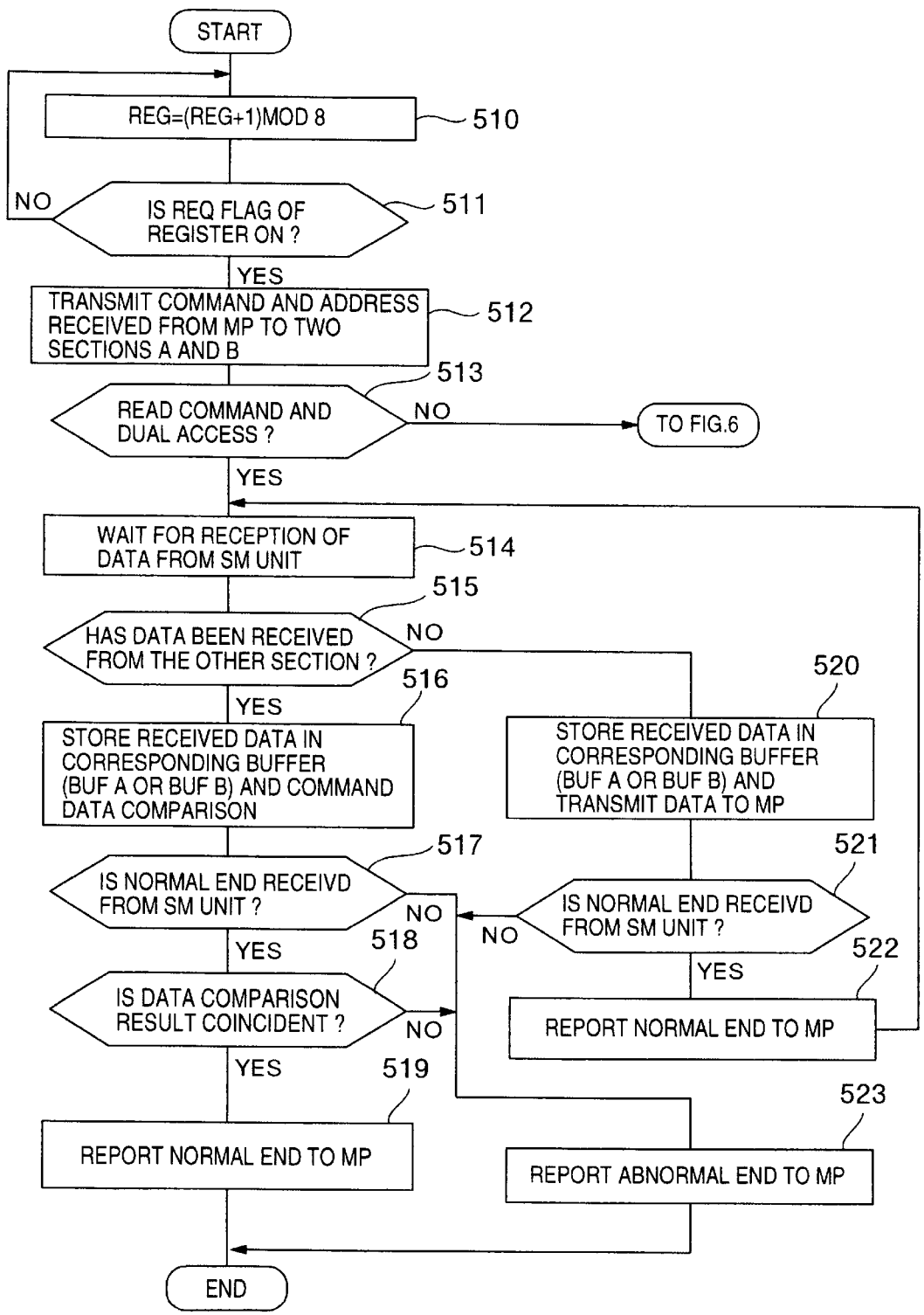
FIG. 5 is a flow chart showing the operation of a controller in the FIG. 3 SM selector.
Figure 6:
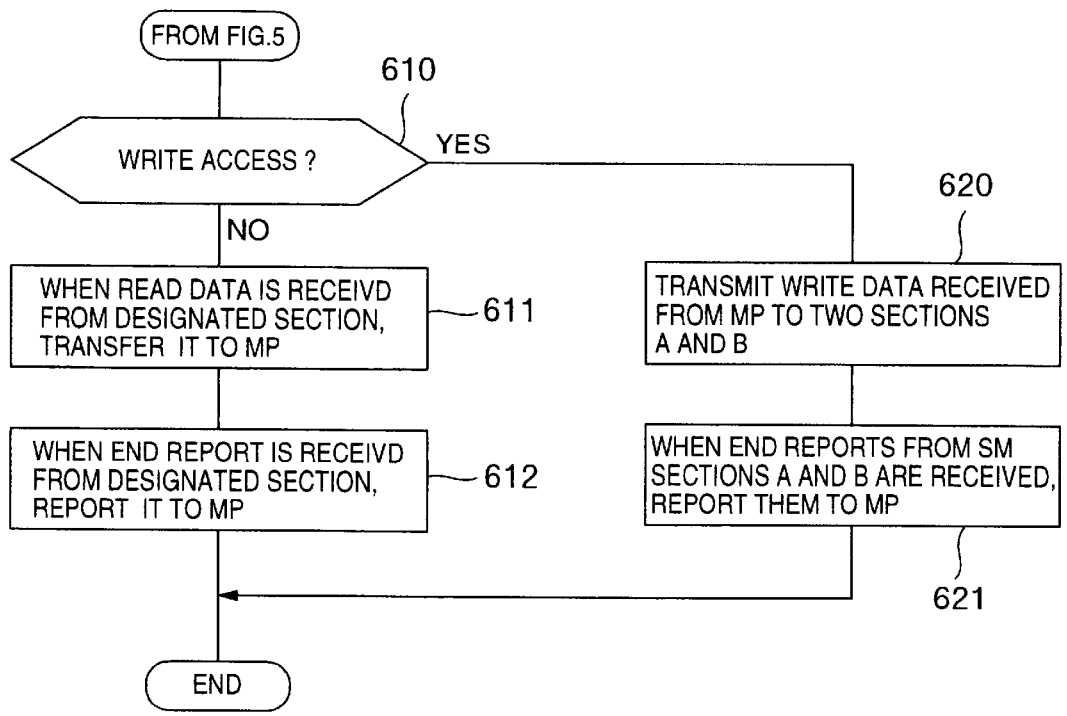
FIG. 6 is a flow chart continuing from FIG. 5.

Referring now to FIGS. 5 and 6, the processing in the controller 300 of each SM selector sections 140a or 140b will be described.

In steps 510 and 511, the controller 300 supervises the registers 310(#0) to 310(#7) to check them for on-state of their REQ flags in a round robin fashion.

When a register 310 being in the flag on-state is found, an ACK signal is returned to the corresponding path to inform the register 310 that the process is ready to start. This can be accomplished by turning on a bit corresponding to ACK of that register 310.

Subsequently, in step 512, the command and address received from the SM access circuit 113 are transferred to both the SM section A (160a) and the SM section B (160b).

The command is then decoded. If the command is determined to be a read command in dual access, the controller 300 waits for read data expected to be transferred from the SM unit 160 in step 514.

In case of dual access, it is necessary to confirm that data read out of the SM section A 160a coincides with data read out of the SM section B 160b.

Since the access process to the SM section A is carried out independently of the access process to the SM section B, the sequence of data read operation is not fixed.

Accordingly, when the read data from one section is received in step 514, it is checked in step 515 whether data from the other section has been received.

If the reception has been completed, the received data is stored in the buffer 330 in step 516. The initially received data is transferred to the MP.

If the data now received is from the SM section A 160a, it is stored in the buffer 330a but if from the SM section B, it is stored in the buffer 330b. Thereafter, the controller 300 commands the data comparator 320 to compare the data.

If the comparison result is determined not to be abnormal in step 518 and the SM unit 160 makes a report on a normal end in step 517, the access is determined to be successful and the normal end is reported to the SM access circuit 113 in step 519, thus completing the process.

When read data is not received from the other section in the step 515, indicating that data now received is initially transferred from the SM unit 160, the received data is stored in the buffer 330a for section A in step 520 when it is from the SM section A 160a but in the buffer 330b for section B when it is from the SM section B 160b.

In addition to the storage in the buffer 330, the read data is transferred to the SM access circuit 113.

Thereafter, in steps 521 and 522, an end report received from the SM unit 160 is transferred to the SM access circuit 113.

By storing the data in the buffer 330 in this manner, the data can be held for subsequent comparison.

At the time that the initial read data is received from the SM unit 160, that data is transferred to the SM access circuit but data read subsequently is not transferred. This is because by reducing the number of data transfer operations to one, wasteful transfer overhead can be reduced.

In case any report on normal end is not received from the SM unit in the step 517 or 521, an abnormal end is reported to the MP in step 523.

When the request from the SM access circuit 113 is determined to be for either write access or single read access in the step 513, the processing shown in FIG. 6 is carried out.

In case of write access request, write data received from the SM access circuit 113 is transferred to the SM section A 160a and SM section B 160b in step 620 and when completion reports are received from the two sections in step 621, they are transferred to the SM access circuit 113.

In case of single read request, read data received from a designated section in step 611 is transferred to the SM access circuit 113 and thereafter, when a completion report is received from the designated section in step 612, it is transferred to the SM access circuit 113, thus completing the process.

In case of either single read access or write access, the command and address are transferred to both the SM section A 160a and the SM section B 160b. But when decoding the command, the SM unit 160 decides whether the access is directed to the SM unit 160 of its own and if the processing is unneeded, it neglects the request.

By doing so, the SM selector need not decide whether the access is for single access and can be reduced in load.

In connection with access to the SM unit 160, there are two kinds of access modes of which one is dual access for accessing the paired two sections of the SM unit 160 and the other is single access for accessing one of the two sections.

This is because control information includes information stored in a single fashion and information stored in a dual fashion. For example, the former information is cache management information and the latter is system management information.

In case of dual access, the SM unit 160 must observe the sequence of access.

The reasons for this will be first described by way of example.

It is now assumed that a processor No. 1 is about to update the contents of the SM unit 160 to A and at the same time, a processor No. 2 is about to update the contents at the same address to B.

If the processors Nos. 1 and 2 execute access to the SM section A 160a in this order and the processors Nos. 2 and 1 execute access to the SM section B 160a in this order, the ultimate contents at the corresponding address is updated to B on the SM section A 160a and to A on the SM section B 160b, so that non-coincidence of data is caused.

This will be explained by making reference to another example.

It is now assumed that the contents of the SM unit 160 is A and the processor No. 1 is about to read the contents of the SM unit 160 and at the same time, the processor No. 2 is about to update the contents at the same address to B.

If the processors Nos. 1 and 2 execute access to the SM section A 160a in this order and the processors Nos. 2 and 1 execute access to the SM section B 160b in this order, data before updating, that is, A is read out of the SM section A and data after updating, that is, B is read out of the SM section B, so that non-coincidence of data is detected.

As will be seen from the above example, control for maintaining the dual state of the SM unit 160 is necessary.

According to a basis idea for controlling the maintenance of the dual state, one of the SM sections 160a and 160b is defined as master with the other defined as slave and the slave is not allowed to be accessed until the master permits execution of the access.

Conceivably, switching between the master and the slave can be effected by various methods including a method in which the unit of section, for example, SM section 160a is always defined as master and the SM section 160b is always handled as slave and another method in which the switching is carried out address area by address area, for example, the SM section 160a and SM section 160b are switched from master to slave or vice versa every 256 bytes.

The present embodiment presupposes the latter method in which switching between master and slave is carried out every address unit.

In this case, a register holding an address unit, for example, is provided in each of the SM unit 160 and SM selector 140 and upon start-up of the system, the MP sets the register. When a SM access is generated, each of the SM unit 160 and selector 140 compares the access address with the address unit stored in the register to examine which one of the two sections is determined to serve as a master.

Figure 7:
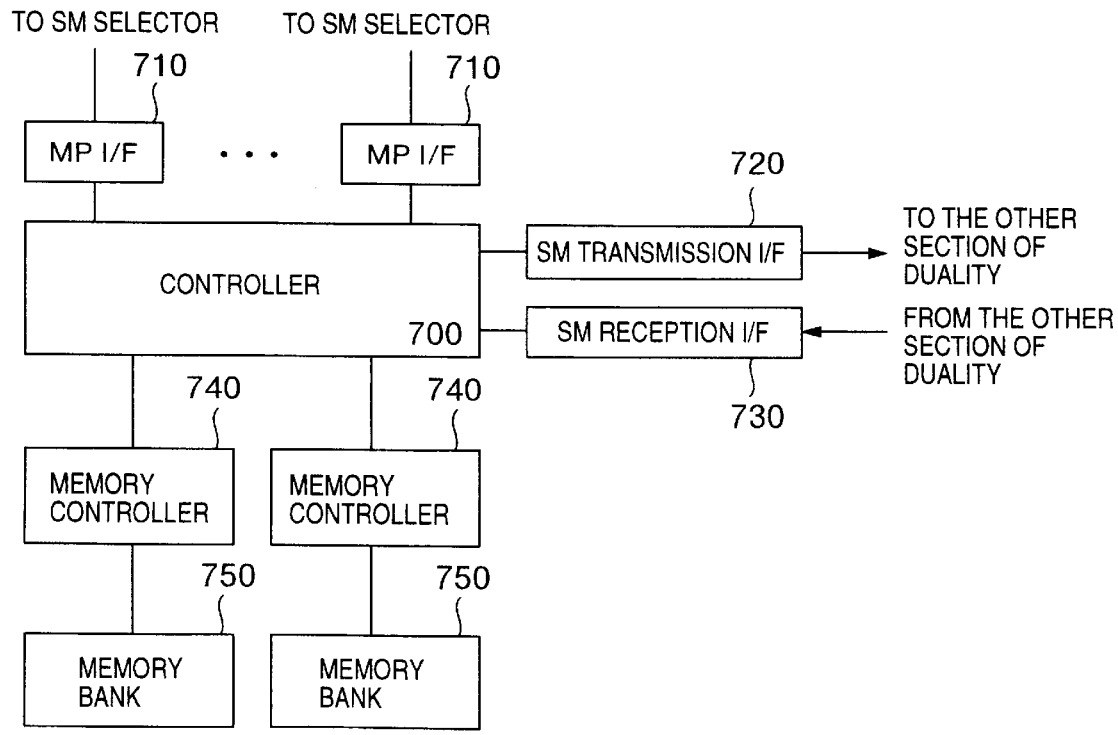
FIG. 7 is a block diagram showing an embodiment of construction of a shared memory unit.

Referring to FIG. 7, the SM unit 160 is constructed as shown therein.

The SM unit 160 comprises MP interfaces (MP IF) 170 each adapted to perform transmission/reception of information between the SM selector 140 and the SM unit, a SM transmission interface 720 for transmitting information to the other section of duality, a SM reception interface 730 for receiving information from the other section, memory banks 750 each adapted to store data, memory controllers 740 each adapted to control read/write from/to the memory bank, and a SM controller 700 for controlling the MP interfaces 710, SM transmission interface 720, SM reception interface 730 and memory controllers 740.

Figure 8:
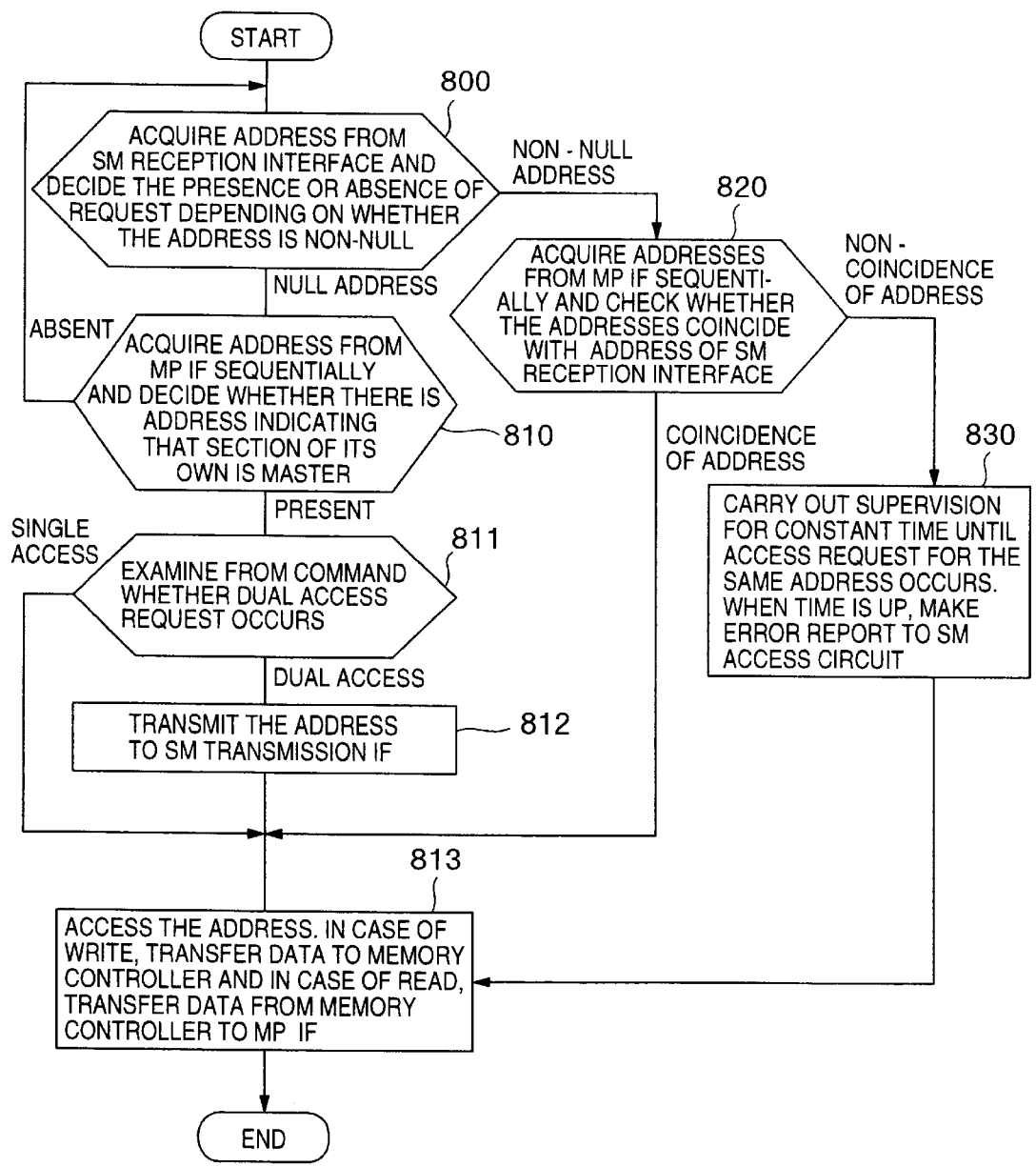
FIG. 8 is a flow chart showing a first embodiment of the operation of a SM controller.

The processing in the SM controller 700 is shown in a flow chart of FIG. 8.

Firstly, in step 800, an address of an object to be accessed is acquired from the SM reception interface 730.

If the acquired address is null, the MP interfaces 710 are sequentially examined in step 810 to find whether there is an access request from the MP 111.

In the presence of the access request, the MP interface 710 holds a command and an address as well as write data in case of write operation.

Then, the address is first acquired and it is examined whether the address is one to be processed by the section of its own which serves as master.

In the absence of an access request for which the section of its own serves as master, the program returns to the step 800 to continue polling.

In the presence of the access request for which the section of its own serves as master, it is examined in accordance with the command in step 811 whether the access request is for dual access.

If the access request is for dual access, that address is transmitted to the SM transmission interface 720 in step 812, thereby requesting the slave section to process that request.

Subsequently, in step 813, a corresponding address is accessed.

In the presence of a read request, the read request and an address are transmitted to the memory controller 740.

When the memory controller 740 accesses the memory bank 750 and data is read, the SM controller 700 transfers that data to the MP interface 710, thereby completing the process.

In case of write access, a write request is transmitted to the memory controller 740 with an address and write data transferred thereto.

The memory controller 740 writes the data at the designated address to thereby complete the process.

When the above processing is completed normally, the SM controller 700 reports a normal end to the MP 111 through the MP interface 710 and the program returns to the step 800.

Next when the address stored in the SM reception interface 730 is determined to be non-null in the step 800, indicating that a process request from the master section is present, the MP interfaces 710 are scanned in step 820 to decide whether there is an access request which coincides with a designated address.

In the presence of the coincident address, access to that address is executed in step 813.

In the absence of the coincident address, the MP interfaces 710 are sequentially supervised in the step 830 until the same access request occurs.

If no access request occurs at the termination of a predetermined waiting time, a time-out error is reported to the MP 111.

It is slightly inefficient to sequentially search the MP interfaces 710 to find an access request having an address which coincides with that received from the SM reception interface 730.

Therefore, conveniently, when a request is issued from the master section, it is decided which one of the MP interfaces 710 the request corresponds to.

To this end, for example, a MP number assigned definitely in the system is stored in the command and the MP number is transmitted to the SM transmission interface 720.

Further, two MP interfaces 710 to which the respective SM selector sections are connected are settled fixedly and the selector section has a correspondence table indicating a MP number and a corresponding MP interface.

With this construction, the number indicative of the MP interface 710 can be settled definitely in the slave from the MP number received from the SM reception interface 730 and the program can immediately shift from the step 820 to the step 813.

According to the above method, the control operation is carried out through the SM transmission interface 720 and SM reception interface 730 and in the dual access, the slave section is not permitted to perform the address process before the master section starts the process, so that the access sequence can always be observed to thereby prevent the aforementioned non-coincidence of data from occurring.

Next, a second embodiment of the SM access will be described. In the second embodiment, the second securing method is employed to secure the sequence of access to the SM unit 160 in the dual access.

Figure 9:
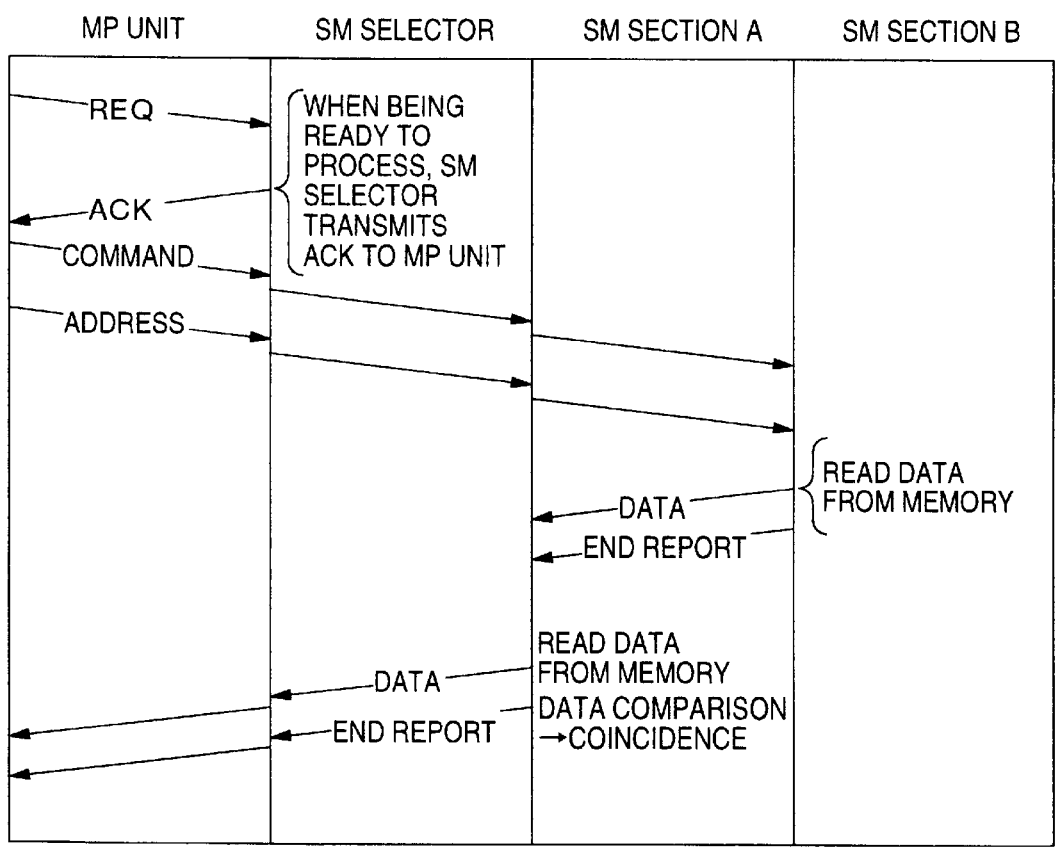
FIG. 9 is a diagram showing a second embodiment of the sequence of SM access.
Figure 10:
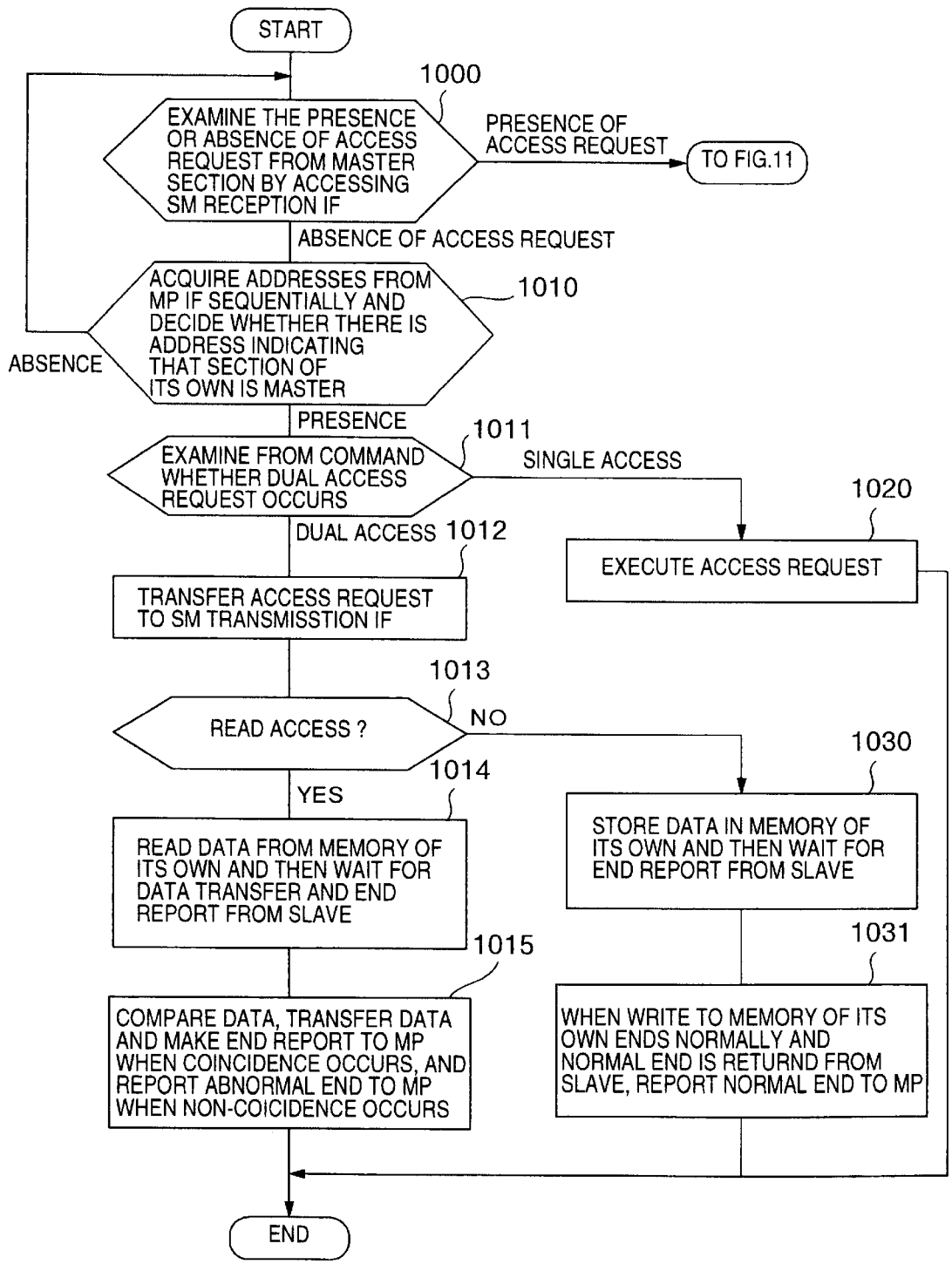
FIG. 10 is a flow chart showing a second embodiment of the operation of the SM controller.
Figure 11:
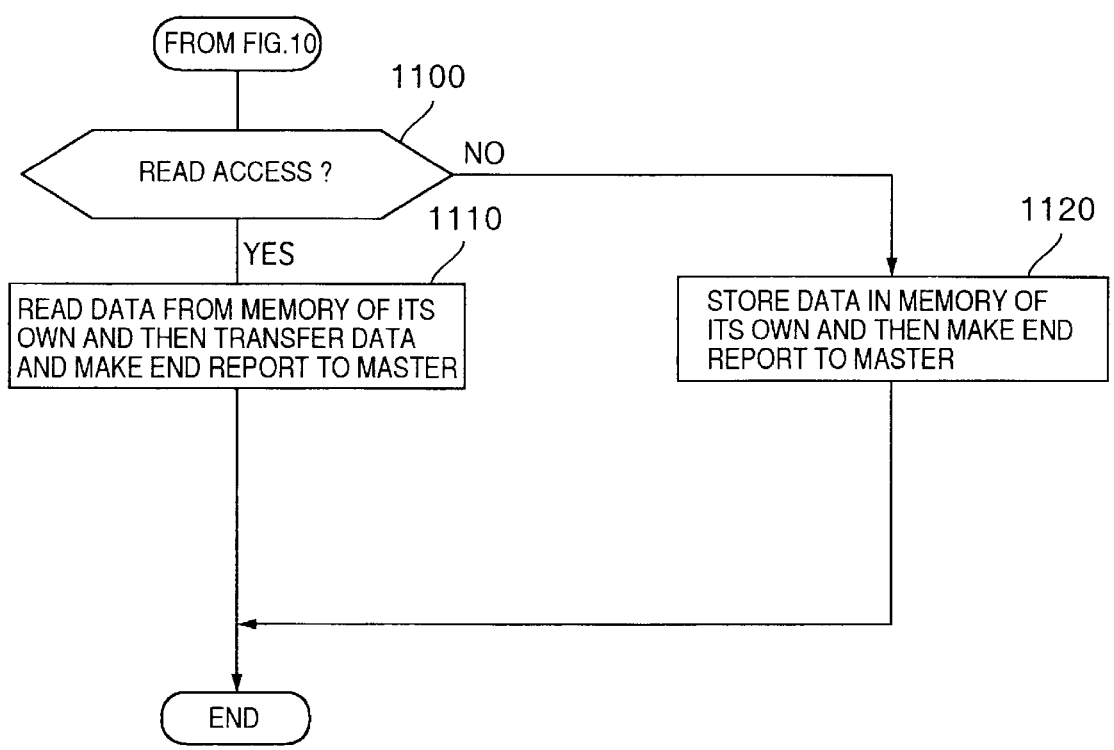
FIG. 11 is a flow chart continuing from FIG. 10.

Reference is now made to FIGS. 9 to 11 to describe the second embodiment.

An example of SM access protocol in read access is shown in FIG. 9.

In the second securing method according to the second embodiment, the SM selector 140 transmits an access request to only a SM section which serves as master.

Here, it is assumed that the SM section 160a is the master and the SM section 160b is a slave.

In case of read access, when receiving an access request, the SM section 160a transmits a command and an address to the SM section 160b through the inter-SM access path 165 and besides accesses the memory so as to read data.

The SM section 160b reads the data from the memory in response to the access request, transmits the data to the SM section 160a and thereafter makes an end report to the SM section 160a.

When receiving the data and the end report from the SM section 160b, the SM section 160a confirms that the data is read normally and then compares data read out of the memory of its own with the data received from the SM section 160b. If the data coincide with each other, the SM section 160a transmits the received data to the SM selector 140 and makes an end report.

In case of write access, when receiving write data from the SM selector 140 following reception of a command and an address, the SM section 160a transmits the command, address and data to the SM section 160b and stores the data in the memory at a designated address.

On the other hand, the SM section 160b stores the data at an address designated by the SM section 160a and thereafter makes an end report to the SM section 160a.

When the write operation to the memory of its own ends and the end report from the SM section 160b is received, the SM section 160a makes an end report to the SM selector 140.

When receiving an access request from the MP section, the SM selector 140 transfers the access request to only the SM section which serves as master.

The waiting process required for the data comparison and dual access is handled by the SM unit 160.

Referring to FIG. 10, the processing, carried out in the SM controller 700 is shown.

In step 1000, the SM controller 700 accesses the SM reception interface 730 to examine the presence or absence of an access request from the master section.

If the access request is present, a command and an address as well as write data in case of write operation are stored in the SM reception interface 730.

In the absence of the access request, the SM controller 700 sequentially accesses the MP interfaces 710 in step 1010 to acquire an address and decides whether there is an access request for which the section of its own serves as master.

In the absence of the access request, the program returns to the step 1000, so that polling is repeated.

If the access request for which the section of its own serves as master is present, the command is decoded in step 1011 to examine whether the access request is for dual access. If the access request is for double access, the access request including a command and an address as well as write data in case of write operation is transferred to the SM transmission interface 720 in step 1012.

Additionally, in case there is a read access request, data is read out of the memory of its own in step 1014 and thereafter, the SM controller waits for data transfer and an end report from the slave.

Receiving the end report, the controller 700 compares in step 1015 data read out of the memory of its own with the read data transferred from the slave and if coincident, the controller 700 transfers that read data through the MP interface 710 and SM selector 140 and then makes an end report.

In case the comparison result indicates non-coincidence of data, data read operation from the master section fails or an abnormal end is reported from the slave section, the controller 700 makes an abnormal report to the MP 111.

When a write access request is determined in the step 1013, write data is stored in the memory of its own at a designated address and then the controller 700 waits for an end report from the slave in step 1030.

Subsequently, when the access to the memory of its own ends normally and a report on normal end is made from the slave in step 1031, the controller 700 makes an end report to the MP 111 through the MP interface 710 and SM selector 140.

In case the access to the memory of its own ends abnormally or a report on abnormal end is made from the slave, the controller 700 reports an abnormal end to the MP 111 and completes the process.

When a single access request is determined in the step 1011, the control for dual access set forth so far is unneeded.

Accordingly, the controller 700 executes access to the memory of its own and makes an end report to the MP 111, thereby completing the process.

When the presence of an access request from the master section is determined in the step 1000 and the access request is for read access, the controller 700 reads data from the memory of its own in step 1110 of FIG. 11, transfers the data to the master and makes an end report.

If the access request is for write access, the controller 700 stores data in the memory of its own in step 1120 and makes an end report to the master, thereby completing the process.

According to the second embodiment of the securing method, the slave executes the process after receiving the access request from the master.

Therefore, the sequence of access can be warranted without fail.

In the first embodiment, the SM selector 140 causes the completion of access to the master to meet the completion of access to the slave and each of the SM sections 160*a* and 160*b* can release the memory when the access to the memory of its own is completed.

On the other hand, in the second embodiment, the master waits for the completion of access to the slave and hence occupation of the SM unit 160 is prolonged by a waiting time.

Therefore, from the standpoint of performance, the first embodiment is preferable.

Next, a method of accessing the CM unit 170 according to the invention will be described.

The CM unit 170 is a memory unit for temporarily storing data expected to be stored in the storage unit and especially, dirty data is stored in the CM unit 170 in a dual fashion. The dirty data is write date from the host which is stored in the SM unit 170 but is not reflected on the storage unit.

Being different from duality in the SM unit 160, the dual data is stored at areas in CM sections 170*a* and 170*b* which are secured by a program operated by the MP 111 and hence the dual data is stored at different areas.

The comparing check as effected in the read access to the SM unit 160 is not executed.

The construction of the CM selector 150 is substantially the same as that of SM selector 140 shown in FIG. 3 with the only exception that the data comparator 320 and the buffers 330 are not provided because comparison of cache data is not carried out as described above.

Also, the construction of the CM unit 170 is substantially the same as that of SM unit 160 shown in FIG. 7 with the only exception that components corresponding to the SM transmission interface 720 and SM reception interface 730 are not provided because the same data is not stored at the same address in a dual fashion and the access sequence need not to be warranted.

An embodiment of a method of storing write data in the CM unit 170 will be described.

It is now assumed that the MP 111 has already acquired a CM area at which the write data is expected to be stored.

The MP 111 sets in the CM access circuit 112 a CM address a and a CM address b at which a command and data are to be stored and starts the CM access circuit 112.

Here, the CM address a and the CM address b are addresses on the CM sections 170*a* and 170*b*, respectively.

With the CM access circuit 112 started, the data is divided into packets having each a constant size and being transferred sequentially.

Each packet is assigned with a command and an address which are updated by the CM access circuit 112 as the execution of data transfer proceeds.

For example, when data of 24 KB is transferred from an address a in the form of packets each being of 2 KB, an initial packet is assigned with a write command and the address a, the next packet is assigned with a write command and an address (a+2048), and an n-th packet is assigned with a write command and an address (a+2048×(n−1)) so that the whole data may be transferred to the CM unit 170 in the form of 12 packets in total.

Figure 12:
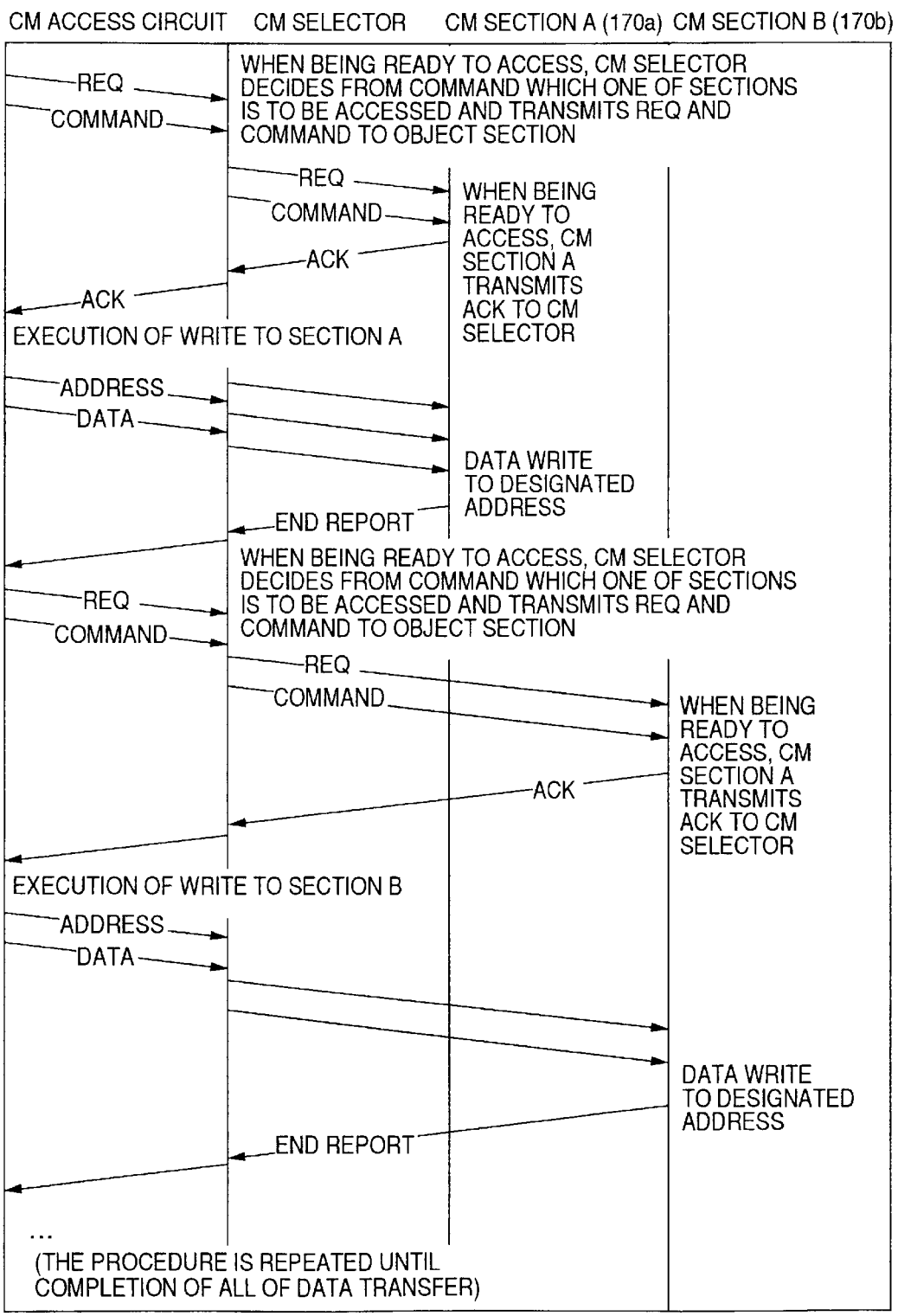
FIG. 12 is a diagram showing an embodiment of write sequence in CM access.

Referring now to FIG. 12, dual write to the CM unit will be described.

In the present embodiment, data is first written to one section (in the example of FIG. 12, CM section 170*a*) and then written to the other section (in the example of FIG. 12, CM section 170*b*).

Accordingly, the MP 111 first prepares a DMA list for CM section 170*a*, that is, a list consisting of a command, an address and a transfer length and describing the contents of the process in the CM access circuit 112 and a DMA list for CM section 170*b* and thereafter starts the CM access circuit.

In respect of each address to be transferred, the CM access circuit 112 selects which one of the MP-CM access paths is used.

The selection is carried out through a method similar to that explained in connection with the SM access circuit 113, so that the MP-CM access path 130 to be used can be switched, for example, every 32 KB.

When the MP-CM access path is selected, a REQ signal and a command of an initial packet are transmitted to the CM selector 150.

The command includes the read/write type, a flag indicating whether the access is for dual access, a flag indicating transfer to the section a and a flag indicating transfer to the section b.

When the CM selector 150 knows from the command that write to the CM section 170*a* prevails, it transmits the REQ signal and the command to the CM section 170*a*.

When the CM section 170*a* is ready to process and receives an ACK signal, it transmits an ACK to the CM access circuit 113. The reasons why REQ-ACK protocol for the CM unit 170 is necessary will be described herein.

If the CM unit 170 has a buffer having a size large enough to receive data, the REQ-ACK protocol is unneeded. More particularly, the data may be saved in the buffer and thereafter may be written from the buffer to the CM at the time the controller of the CM unit 170 is ready to process.

But, generally, the length of data to be transferred is large in case of cache access (in the present embodiment, 2 KB is assumed) and it is wasteful from the standpoint of costs to provide buffers for the individual cache access paths 130.

Thus, by returning the ACK to the CM selector 150 at the time that the CM unit 170 is ready to process and by transferring transferred data directly to the CM unit, the aforementioned buffer can be dispensed with.

In case of SM unit access, the size of one transfer operation is small amounting up to about 1 word and therefore the buffers are provided for the individual SM access paths, without doing matter.

Therefore, the REQ-ACK protocol from the SM selector 140 to the SM unit 160 is unneeded and the command, address and data are stored in the register 310.

Now, when the CM access circuit 112 receives the ACK, it transfers the address and data and waits for an end report.

The CM selector circuit transfers the address and command to the CM section 170a which is an object to be accessed. When the CM section 170a completes write of the data, the CM selector circuit receives an end report and transfers it to the CM access circuit 112, thereby completing the process.

Thereafter, the CM access circuit 112 executes the process of write to the CM section 170b. The sequence of this write process is similar to that of write operation to the CM section 170a and will not be described herein.

Through the above procedure, dual write of one packet to the CM sections 170a and 170b is completed. Thus, this process is repeated for all packets.

In the present embodiment as above, the command, address and data are transferred in correspondence to the CM sections 170a and 170b and therefore, the utilization efficiency of the MP□CM access paths 130 and 135 and the CM selector 150 is bad.

Accordingly, another embodiment is directed to solve this problem as will be described below.

Figure 13:
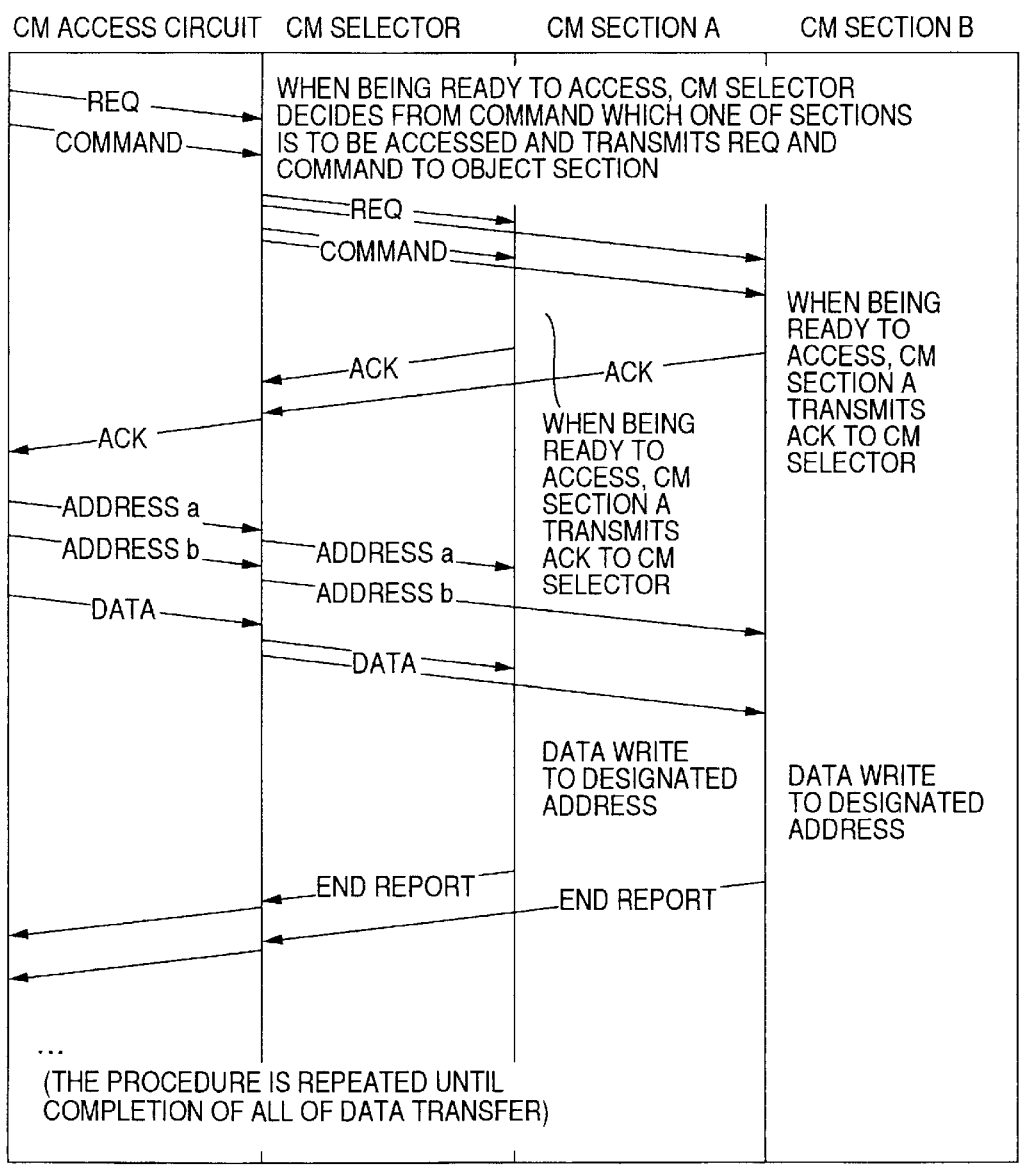
FIG. 13 is a diagram showing another embodiment of write sequence in CM access.

Referring to FIG. 13, there is illustrated a sequence of dual write to the CM unit 170.

The CM access circuit transfers to the CM selector 150 a command together with a REQ signal.

The command is a write access command in which a dual access flag, an access flag to the CM section 170a and an access flag to the CM section 170b are on.

When receiving the command, the CM selector 150 transfers the REQ signal and the command to both the CM sections 170a and 170b.

When both the CM sections 170a and 170b are ready to process and they return ACK signals, the CM selector circuit 150 transmits an ACK signal to the CM access circuit 112.

Thereafter, the CM access circuit 112 transfers an address of the CM section 170a, an address of the CM section 170b and write data to the CM selector 150 and then, the CM selector 150 transfers the address of CM section 170a to the CM section 170a and the address of CM section 170b to the CM section 170b. The write data is transferred to both the CM sections 170a and 170b.

As in the immediately previous embodiment, the CM unit 170 stores the write data at the designated address and then makes an end report to the CM access circuit 112 through the CM selector 150.

According to the present embodiment, one transfer operation of write data suffices and occupation time of the MP-CM selector access paths 130 can be reduced correspondingly.

Further, the CM sections 170a and 170b are processed in parallel and therefore, the response can be shortened.

In still another embodiment of the invention, a method of copying data between CM sections will be described.

Conceivably, a copy originator and a copy destination in copying between the CM sections are switched in four ways, that is, from CM section 170a to CM section 170a, from CM section 170b to CM section 170b, from CM section 170a to CM section 170b, and from CM section 170b to CM section 170a.

Firstly, a method applicable to the above four ways will be described in which data is read out of a copy originator CM section to the buffer 115 by using the buffer 115 of the MP section and thereafter the data is copied from the buffer 115 to a copy destination CM section.

Figure 14:
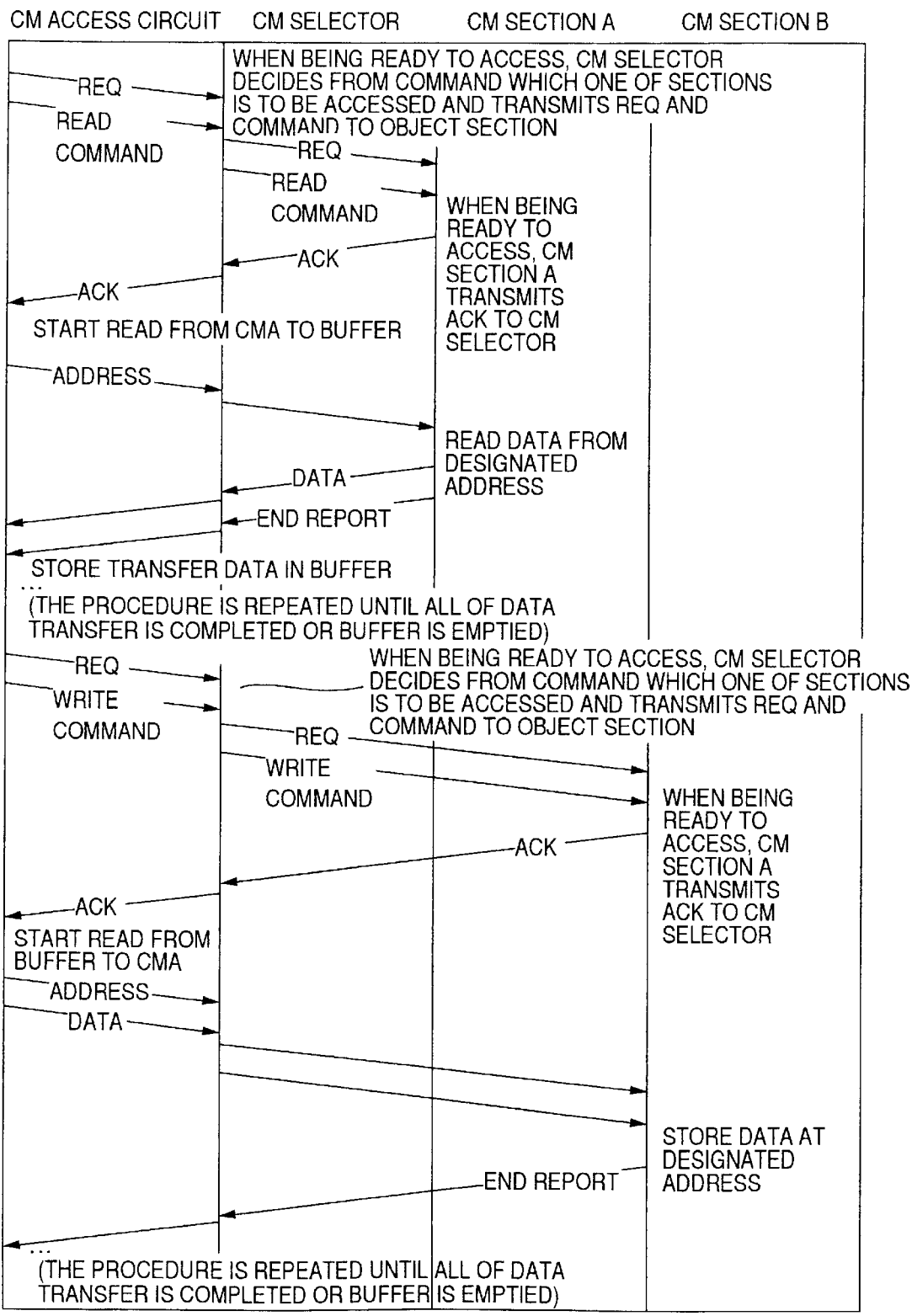
FIG. 14 is a diagram showing an embodiment of copy sequence in CM access.

Referring to FIG. 14, the sequence of the inter-cache copying method through the medium of the buffer 115 will be summed up.

In case the buffer 115 intervenes, copying which exceeds in amount the capacity of the buffer 115 cannot be effected through one operation and a plurality of copying operations need to be carried out. These operations are controlled by the MP 111.

The MP 111 first prepares a DMA list of a read request for the copy originator CM section (in FIG. 14, CM section 170a) and a DMA list of a write request for the copy destination CM section (in FIG. 14, CM section 170b) and starts the CM access circuit 112.

Here, the upper limit of the size of transfer in the DMA list equals the buffer size or capacity.

Through the method set forth so far, the CM access circuit first reads data from the copy originator CM section 170a and delivers it to the buffer 115.

When this operation is completed, the CM access circuit subsequently writes the data from the buffer 115 to the copy destination CM section 170b to complete the process and informs the MP 111 of the copy completion.

The MP 111 does not intervene during a time interval ranging from commanding the copy start to receiving the end report.

In case data to be copied still remains because of the limited buffer size, the MP successively prepares a DMA list and continues the copy process.

Next, still another embodiment directed to an inter-cache copy method without resort to the intervening buffer 115 will be described.

In this method, data read out of a copy originator is turned back at the CM selector 150 so as to be transferred to a copy destination.

Since the data flows to pass through the CM selector 150 (without being stored in the buffer), CM sections representing the copy originator and copy destination must differ from each other. In other words, this method is applicable only to either copying from CM section 170a to CM section 170b or copying from CM section 170b to CM section 170a.

Figure 15:
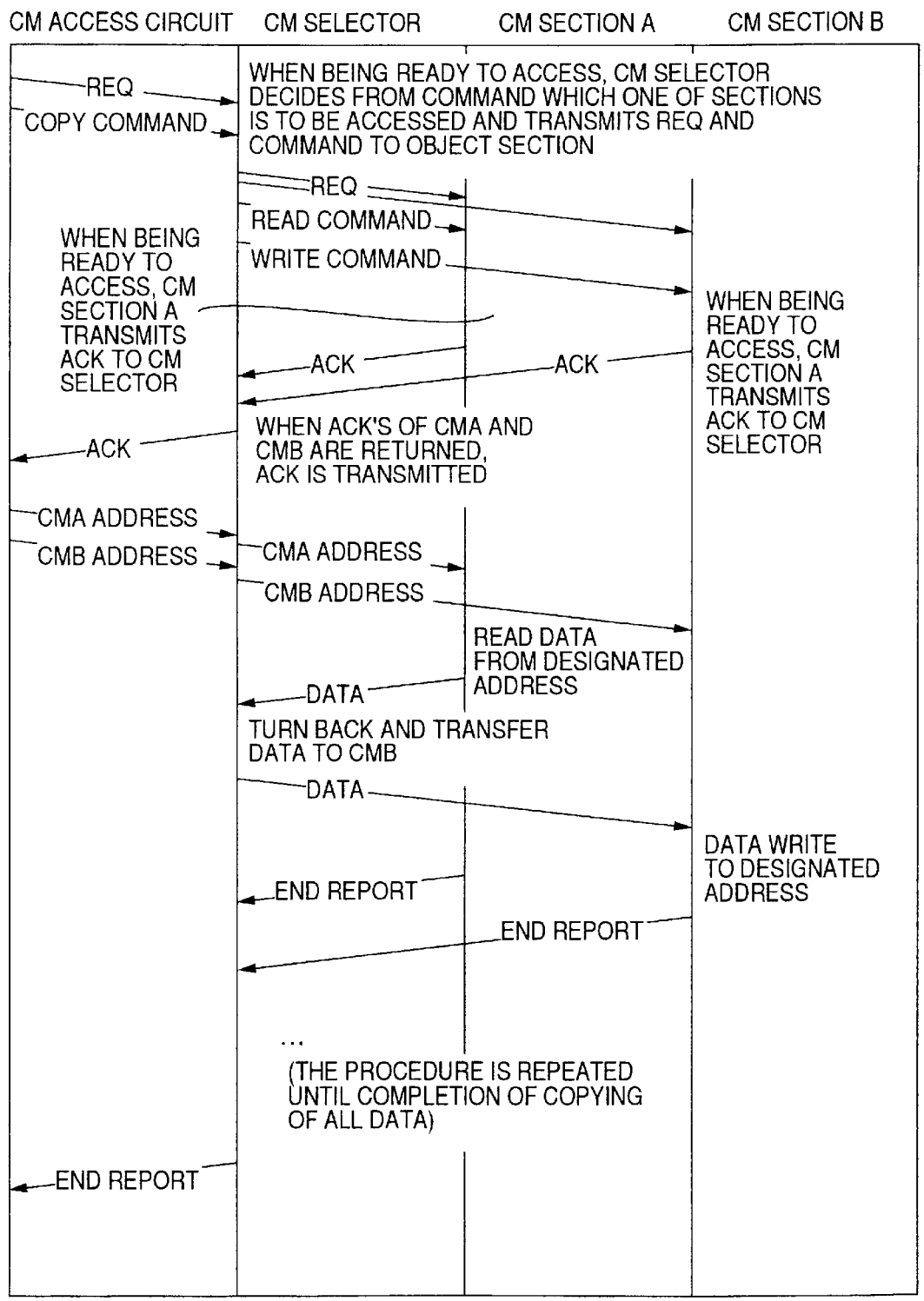
FIG. 15 is a diagram showing another embodiment of copy sequence in CM access.

Referring to FIG. 15, the sequence of the inter-cache copying method in which data is turned back at the selector will be summed up.

The MP 111 prepares a DMA list for execution of the inter-cache copy and thereafter, starts the CM selector 150 by asserting a REQ signal.

Here, an inter-cache copy command, a copy originator address and a copy destination address are included in the list.

When started, the CM selector 150 issues requests for copy to both a copy originator (In FIG. 15, CM section 170a) and a copy destination (in FIG. 15, CM section 170b).

Both the CM sections 170a and 170b are ready to process and they return ACK's to the CM selector which in turn returns an ACK to the CM access circuit 113.

Responsive to the ACK, the CM access circuit 113 transmits a command, an address of CM section 170a and an address of CM section 170b to the CM selector.

The CM selector 150 transfers the command to both the CM sections 170a and 170b, the address of CM section 170a to the CM section 170a and the address of CM section 170b to the CM section 170b.

When data is read out of the copy originator CM section 170a, the data is transferred to the copy destination CM section 170b.

Like the write process, the CM section 170b is ready to receive the data and stores the received data at the designated address.

The above read process from the CM section 170a and the write process to the CM section 170b are repeated until copying of all data is completed.

Advantages of the two inter-cache copying methods will be summed up as below.

In the copying method in which data is turned back at the CM selector 150, read from the copy originator and write to the copy destination can be carried out in parallel.

Since the data read out of the copy originator is not saved in the buffer, copying of data of any size can be completed by one operation start.

Accordingly, as compared to the copying method in which the buffer 115 intervenes, time consumed by copying can be shortened.

On the other hand, because of transfer of copy data directly to the copy destination without saving data to the buffer, there arises such a disadvantage that copying between the same sections, that is, copying from CM section 170a to CM section 170a and copying from CM section 170b to CM section 170b cannot be ensured.

Accordingly, it is preferable that copying between the same sections be carried out in accordance with the copying method in which the buffer 115 intervenes and copying between the different sections be carried out in accordance with the copying method in which data is turned back at the CM selector 150.

In the foregoing embodiments, the storage control apparatus 195 has been described as being a typical example constructed as shown in FIG. 1 but the present invention may be applied to the storage control apparatus constructed as below to attain similar effects to those described hereinbefore.

Figure 16:
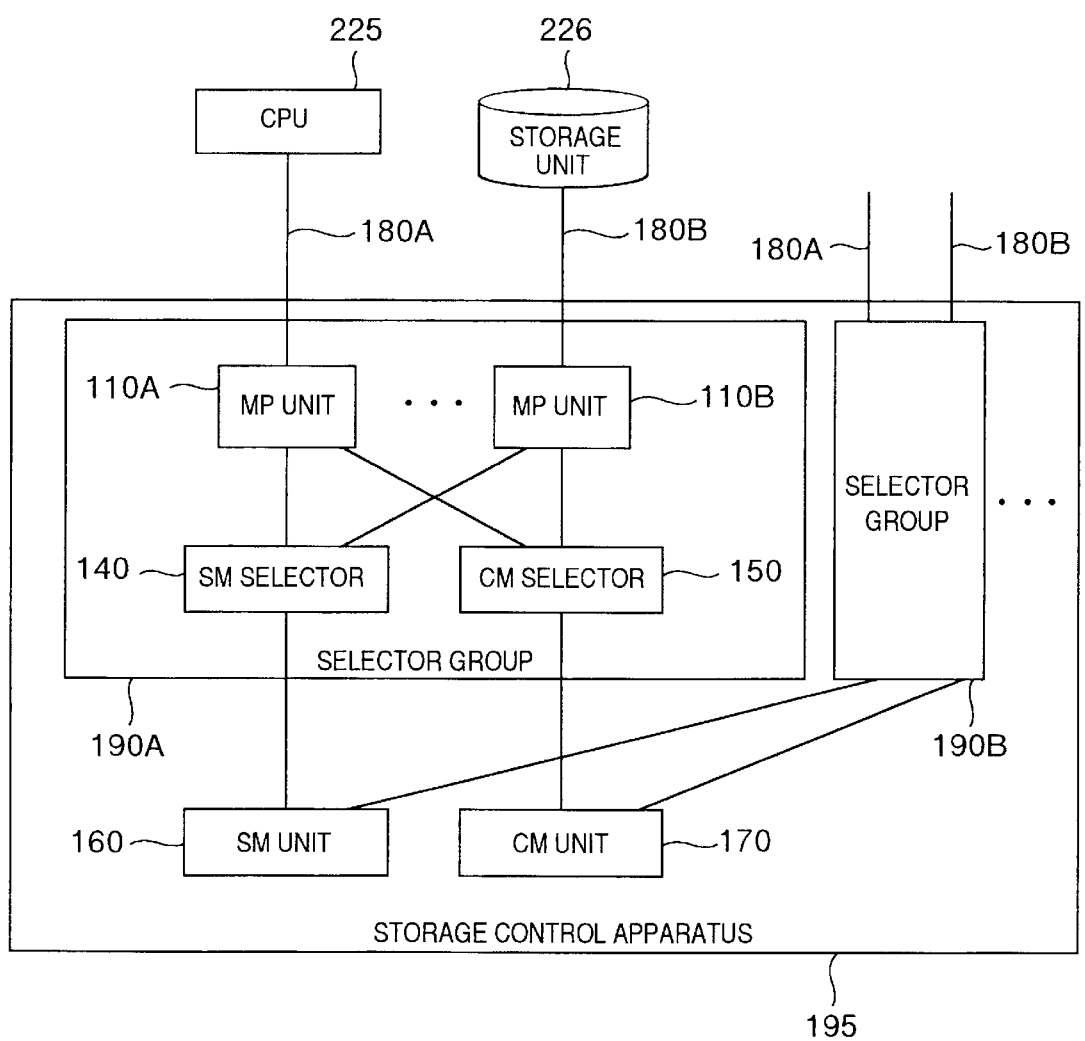
FIG. 16 is a block diagram showing an embodiment of basic construction of the storage control apparatus according to the invention.

Referring to FIG. 16, there is illustrated in block form an example of the basic construction of the storage control apparatus according to the invention. The storage control apparatus of FIG. 16 comprises a selector group 190A including two MP units 110A and 110B which are coupled to a CPU 225 and a storage unit 226, respectively, one SM selector 140 and one CM selector 150, one SM unit 160 and one CM unit 170. Each of the MP units 110A and 110B is coupled to the SM selector 140 and CM selector 150 through access paths, the SM selector 140 is coupled to the SM unit 160 through one path and the CM selector 150 is coupled to the CM unit 170 through one path. Accordingly, the number (1) of CM access path for coupling the CM selector 150 to the CM unit 170 can be smaller than the number (2) of CM access paths for coupling each of the MP units 110A and 110B to the CM selector 150. Similarly, the number (1) of SM access path for coupling the SM selector 140 to the SM unit 160 can be smaller than the number (2) of CM access paths for coupling each of the MP units 110A and 110B to the SM selector 140. It will be appreciated that more than two selector groups may be provided (in FIG. 16, another selector group 190B is illustrated).

Figure 17:
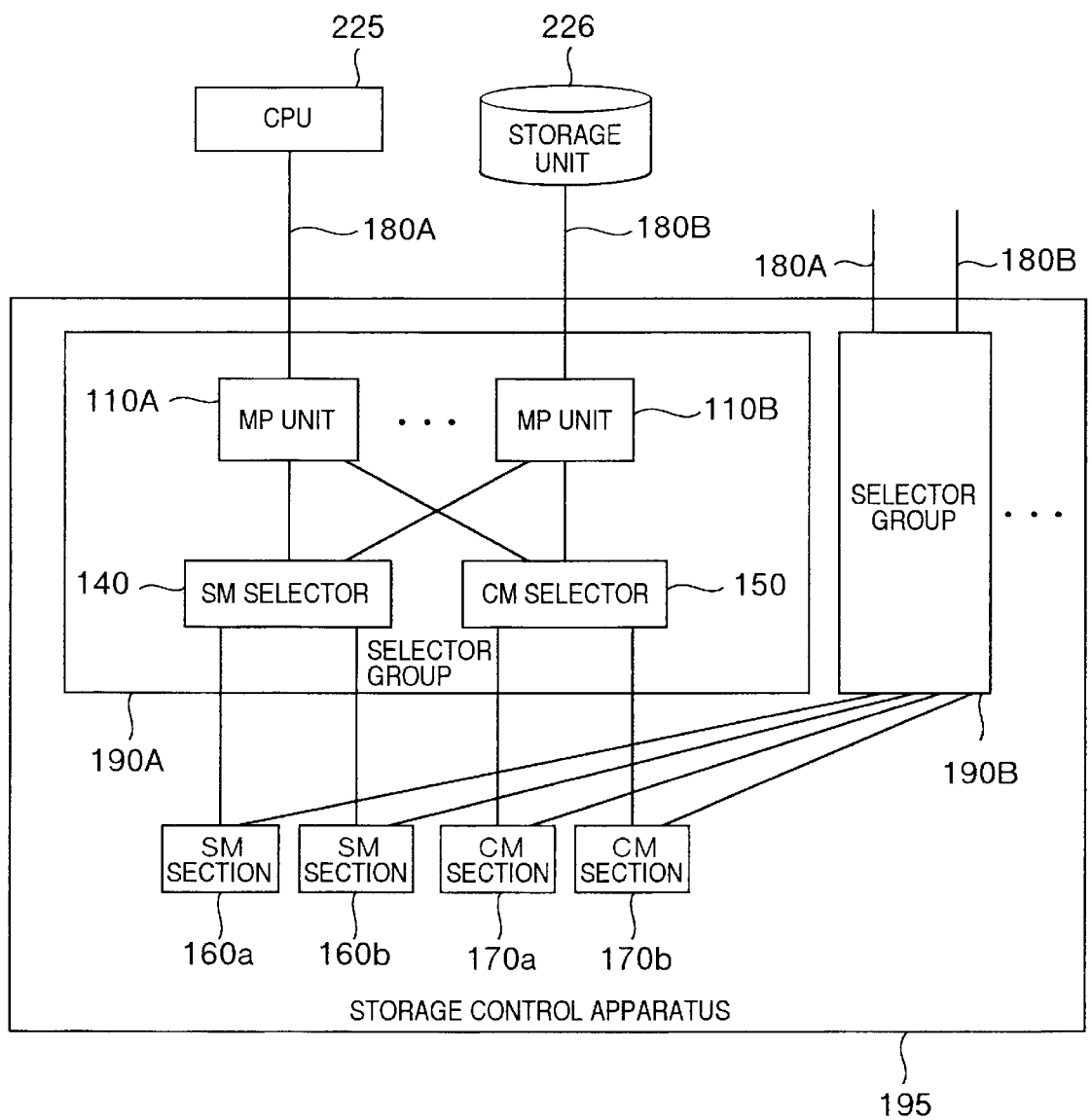
FIG. 17 is a block diagram showing a modification of the FIG. 16 storage control apparatus.

Referring to FIG. 17, there is illustrated in block form a modification of the FIG. 16 storage control apparatus. In the storage control apparatus of FIG. 17, each of the SM unit 160 and CM unit 170 is made to have a dual structure in order to increase the storage capacity and improve the reliability. More particularly, the storage control apparatus comprises a selector group 190A including two MP units 110A and 110B which are coupled to a CPU 225 and a storage unit 226, one SM selector 140 and one CM selector 150, two SM sections 160a and 160b and two CM units 170a and 170b. Each of the MP units 110A and 110B is coupled to the SM selector 140 and CM selector 150 through access paths, the SM selector 140 is coupled to each of the SM sections 160a and 160b through one path and the CM selector 150 is coupled to each of the CM sections 170a and 170b through one path. It will be appreciated that more than two selector groups may be provided (in FIG. 17, another selector group 190B is illustrated).

Referring to FIG. 18, there is illustrated in block form another example of the basic construction of the storage control apparatus according to the invention. In the storage control apparatus of FIG. 18, one selector functionally serves both as a SM selector and a CM selector and in addition, part of a CM unit is used as a SM unit. More particularly, in FIG. 18, the storage control apparatus comprises a selector group 190A including two MP units 110A and 110B which are coupled to a CPU 225 and a storage unit 226, respectively, and one selector 145, and one CM unit 170 part of which is usable as a SM unit. In this case, a SM area and a CM area in the memory 170 may be distributed in accordance with addresses and the SM area or the CM area may be accessed selectively in accordance with an address received by an access circuit in the memory 170. Alternatively, access to the SM area may be discriminated from that to the CM area by changing protocol, the SM area may be discriminated from the CM area by adding, to an access request, information concerning access to the SM area and CM area, or the SM area may be discriminated from the CM area by adding, to a command, information concerning access to the SM area and CM area. In this construction, each of the MP units 110A and 110B is coupled to the selector 145 through an access path and the selector 145 is coupled to the CM unit 170 through one path. Accordingly, the number (1) of CM access path for coupling the selector 145 to the CM unit 170 can be smaller than the number (2) of CM access paths (2) for coupling the MP units 110A and 110B to the selector 145. It will be appreciated that more than two selector groups may be provided (in FIG. 18, another selector group 190B is illustrated).

Figure 19:
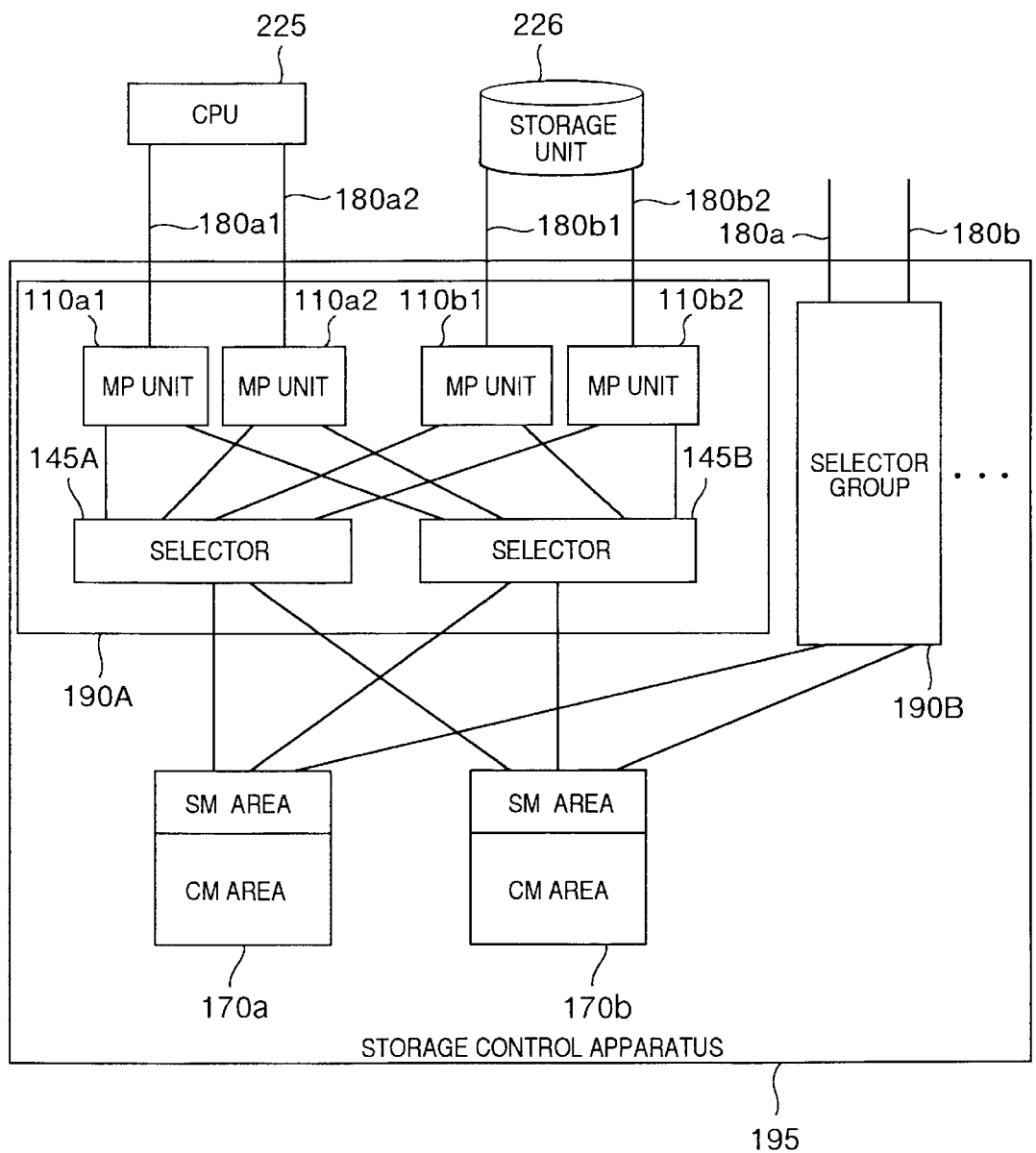
FIG. 19 is a block diagram showing a modification of the storage control apparatus shown in FIG. 18.

Referring now to FIG. 19, a modification of the FIG. 18 storage control apparatus is illustrated in block form. In this modification, there are provided more than three MP units and two selectors in one selector group. Further, the CM unit has a dual structure. More particularly, each of the MP units 110a1, 110a2, 110b1 and 110b2 is coupled to selectors 145A and 145B through access paths, and each of the selectors 145A and 145B is coupled to CM units 170a and 170b through paths. Accordingly, the number (2) of access paths for coupling the selector 145A to the CM units 170a and 170b can be smaller than the number (4) of access paths for coupling the MP units 110a1, 110a2, 110b1 and 110b2 to the selector 145A. Similarly, the number (2) of access paths for coupling the selector 145B to the CM units 170a and 170b can be smaller than the number (4) of access paths for coupling the MP units 110a1, 110a2, 110b1 and 110b2 to the selector 145B. It will be appreciated that more than two selector groups may be provided (in FIG. 19, another selector group 190B is illustrated).

Figure 20:
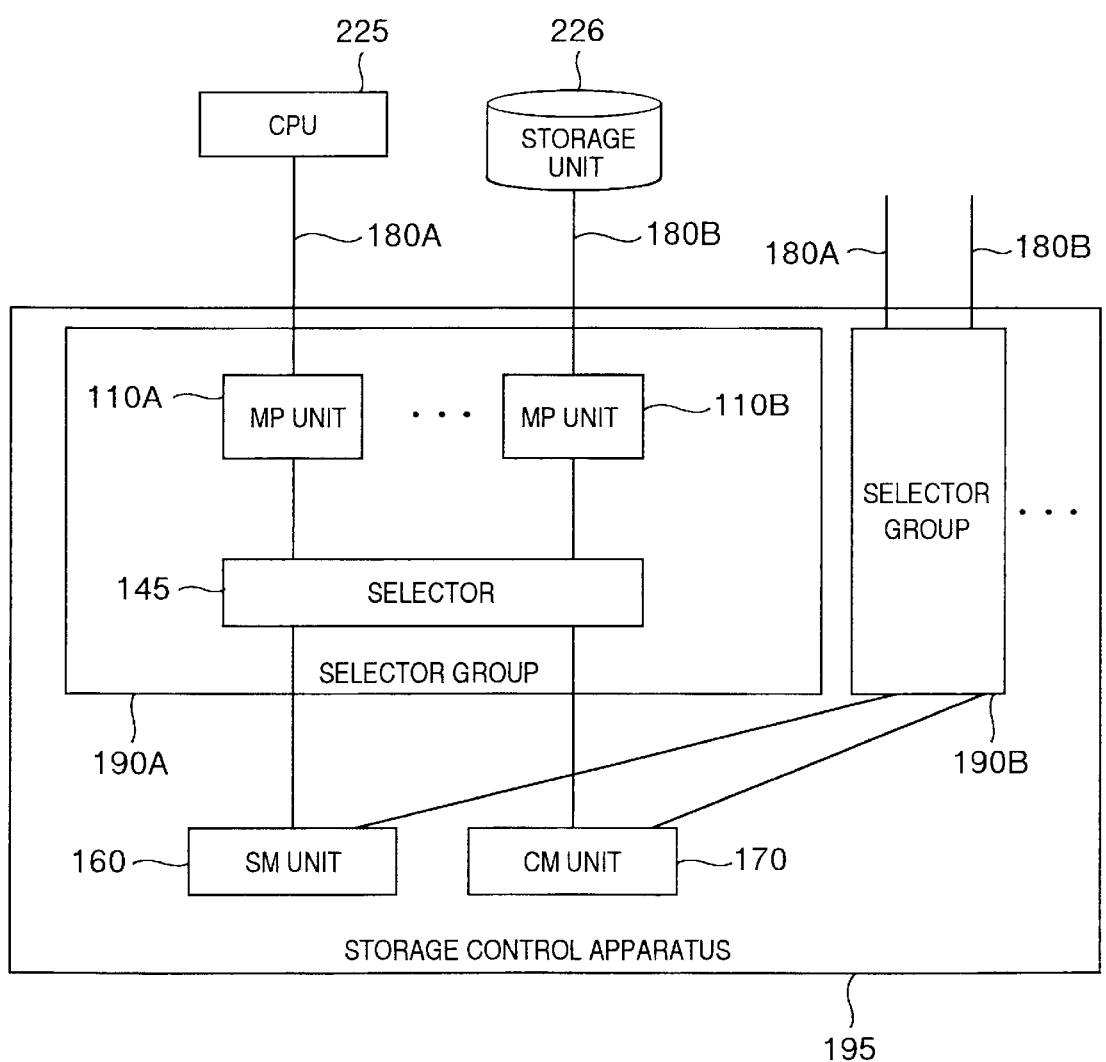
FIG. 20 is a block diagram showing a modification of the storage control apparatus shown in FIG. 16.

FIG. 20 is a block diagram showing a modification of the storage control apparatus shown in FIG. 16. The modification of FIG. 20 differs from the storage control apparatus shown in FIG. 16 only in a point that like the arrangement of FIG. 18 the SM selector 140 and the CM selector 150 of FIG. 16 are formed as a single selector 145 so that the selector 145 serves both as the SM selector 140 and the CM selector 150 of FIG. 16.

Figure 21:
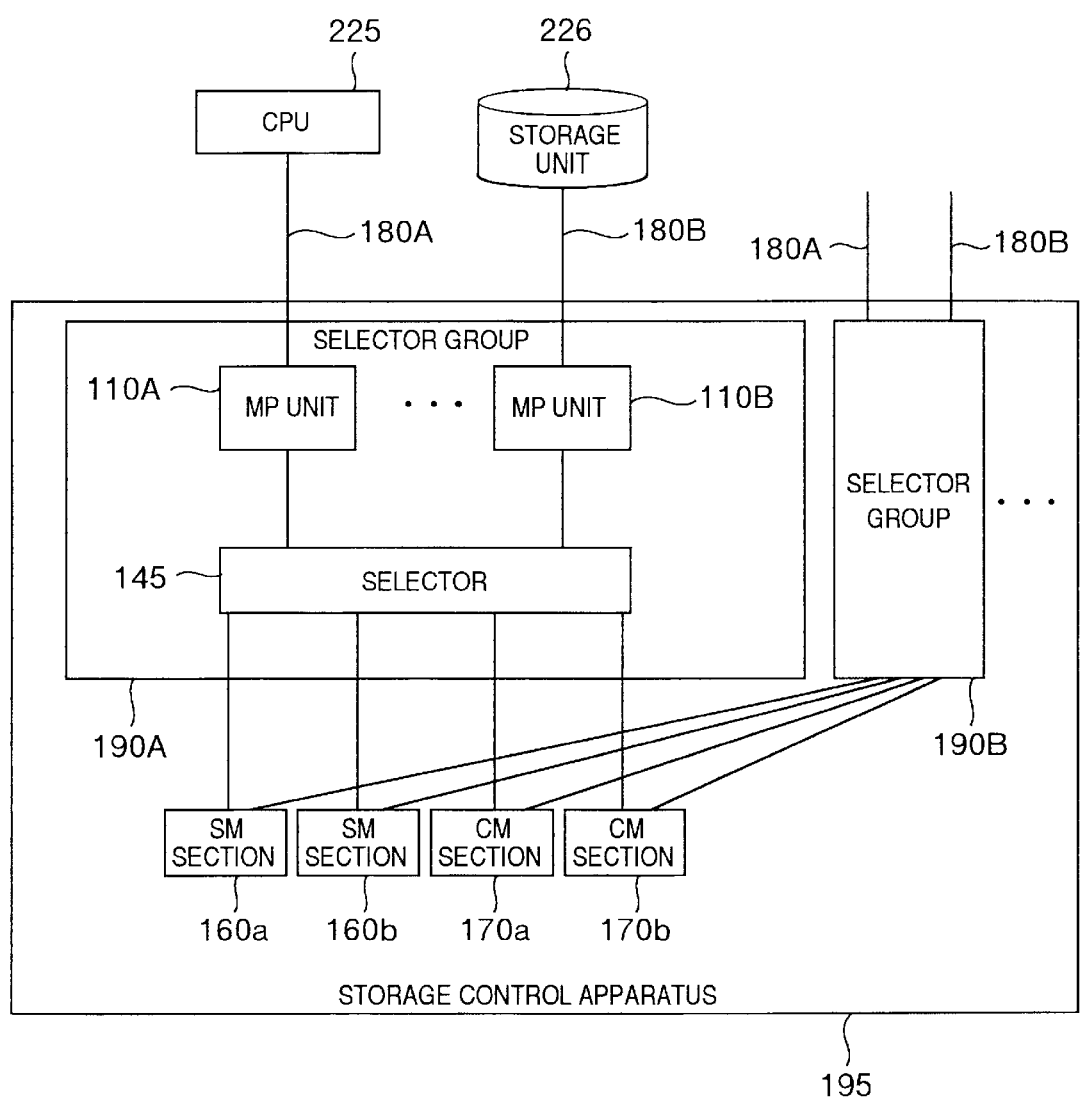
FIG. 21 is a block diagram showing a modification of the storage control apparatus shown in FIG. 20.

FIG. 21 is a block diagram showing a modification of the storage control apparatus shown in FIG. 20. The modification of FIG. 21 differs from the storage control apparatus shown in FIG. 20 only in a point that the SM unit 160 of FIG. 20 is arranged to have a dual structure of SM sections 160a and 160b and also the CM unit 170 of FIG. 20 is arranged to have a dual structure of CM sections 170a and 170b.

In the foregoing embodiments, the storage control apparatus has been described as being exemplarily coupled to the single CPU and the single storage unit but the storage control apparatus may be coupled to a plurality of CPU's and a plurality of storage units.

As described above, according to the present invention, by interposing the selector between a plurality of processors and a plurality of memory units and selecting and executing a request for access to a memory unit by means of the selector, the number of wiring lines per package can be reduced and the shortage of the number of pins and of package connectors in a LSI can be eliminated.

In addition, according to the invention, by defining one section of a SM unit having a dual structure as master and the other as slave and providing a mechanism in which the SM sections are interconnected together and the slave executes a dual access request only when a request for processing is received from the master, the dual state can be maintained between the SM sections.

What is claimed is:

1. A storage control apparatus coupled to a central processing unit and a storage unit, wherein said storage control apparatus is configured to control input/output of data between said control processing unit and said storage unit, said storage control apparatus comprising:

at least two processors coupled to said central processing unit and said storage unit;

a cache memory unit for temporarily storing data of said storage unit;

a shared memory unit for storing information concerning control of said cache memory unit and said storage unit; and a selector coupled to each of said at least two processors, said cache memory unit and said shared memory unit through access paths to selectively apply access requests from said at least two processors to said cache memory unit and said shared memory unit, wherein said shared memory unit includes a shared memory section serving as master and another shared memory section serving as slave, said shared memory sections being coupled to said selector and coupled to each other by an inter-shared memory path and each shared memory section having an access circuit;

wherein said selector controls said access requests based on said information, receives an address, a write command and write data from one of said two processors which performs a write process to said shared memory unit, and transmits said address, write command and write data to each of said shared memory sections;

wherein said access circuit of said shared memory section serving as master receives said address, write command and write data from said selector and sends said write data and said received address to said shared memory section serving as slave through said inter-shared memory path; and wherein said access circuit of said shared memory section serving as slave writes said write data received through said inter-shared memory path to a location which is indicated by said address received through said inter-shared memory path.

2. A storage control unit according to claim 1, wherein said access circuit of said shared memory section serving as slave compares said address received through said inter-shared memory path with said address from said selector and writes said write data from said selector to a location which is indicated by said address received through said inter-shared memory path when said addresses coincide with each other.

3. A storage control apparatus coupled to a central processing unit and a storage unit, wherein said storage control apparatus is configured to control input/output of data between said control processing unit and said storage unit, said storage control apparatus comprising:

at least two processors coupled to said central processing unit and said storage unit;

a cache memory unit for temporarily storing data of said storage unit;

a shared memory unit for storing information concerning control of said cache memory unit and said storage unit; and a selector coupled to each of said at least two processors, said cache memory unit and said shared memory unit through access paths to selectively apply access requests from said at least two processors to said cache memory unit and said shared memory unit, wherein said shared memory unit has a shared memory section serving as master and another shared memory section serving as slave, said shared memory sections being coupled to said selector and coupled to each other by an inter-shared memory path and each shared memory section having an access circuit;

wherein said selector controls said access requests based on said information, receives an address and a read command from one of said two processors when said one processor performs a read process to said shared memory unit, and transmits said address and read command to each of said two shared memory sections;

wherein said access circuit of said shared memory section serving as master receives said address and read command from said selector, reads data from a location indicated by said address to transfer it to said selector, and transmits said address to said shared memory section serving as slave through said inter-shared memory path;

wherein said access circuit of said shared memory section serving as slave reads out data from a location which is indicated by said address received through said inter-shared memory path and transfers the read-out data to said selector; and wherein said selector compares the read data received from said shared memory section serving as master with the read data received from said shared memory section serving as slave and, when both said data coincide with each other, transmits said coincidental read data to one of said two processors.

4. A storage control apparatus according to claim 3, wherein said access circuit of said shared memory section serving as slave compares said address received through said inter-shared memory path with said address from said selector, reads out data from a location indicated by said address received through said inter-shared memory path, and transfers the read data to said selector when both said addresses coincide with each other.

5. A storage control apparatus coupled to a central processing unit and a storage unit, wherein said storage control apparatus is configured to control input/output of data between said control processing unit and said storage unit, said storage control apparatus comprising:

at least two processors coupled to said central processing unit and said storage unit;

a cache memory unit for temporarily storing data of said storage unit;

a shared memory unit for storing information concerning control of said cache memory unit and said storage unit; and a selector coupled to each of said at least two processors, said cache memory unit and said shared memory unit through access paths to selectively apply access requests from said at least two processors to said cache memory unit and said shared memory unit, wherein said shared memory unit has a shared memory section serving as master and another shared memory section serving as slave, said shared memory sections being coupled to said selector and coupled to each other by an inter-shared memory path and each shared memory section having an access circuit;

wherein said selector controls said access requests based on said information, receives an address, a write command and write data from one of said two processors when said one processor performs a write process to said shared memory unit, and transmits said address, said write command and said write data to said shared memory section serving as master;

wherein said access circuit of said shared memory section serving as master writes said write data to a location indicated by said address in response to said write command from said selector and transmits said address, write command and write data to said shared memory section serving as slave through said inter-shared memory path; and wherein said access circuit of said shared memory section serving as slave writes said write data received through said inter-shared memory path to a location indicated by said address received through said inter-shared memory path and transmits a write end report to said shared memory section serving as master through said inter-shared memory path.

6. A storage control apparatus coupled to a central processing unit and a storage unit, wherein said storage control apparatus is configured to control input/output of data between said control processing unit and said storage unit, said storage control apparatus comprising:

at least two processors coupled to said central processing unit and said storage unit;

a cache memory unit for temporarily storing data of said storage unit;

a shared memory unit for storing information concerning control of said cache memory unit and said storage unit; and a selector coupled to each of said at least two processors, said cache memory unit and said shared memory unit through access paths to selectively apply access requests from said at least two processors to said cache memory unit and said shared memory unit, wherein said shared memory unit has a shared memory section serving as master and another shared memory section serving as slave, said shared memory sections being coupled to said selector and coupled to each other by an inter-shared memory path and each shared memory section having an access circuit;

wherein said selector controls said access requests based on said information, receives an address and a read command from one of said two processors when said one processor performs a read process of said shared memory unit, and transmits said address and read command to said shared memory section serving as master;

wherein said access circuit of said shared memory section serving as master reads out data from a location indicated by said address in response to said read command from said selector, and transmits said address and said read command to said shared memory section serving as slave through said inter-shared memory path;

wherein said access circuit of said shared memory section serving as slave reads out data from a location indicated by said address received through said inter-shared memory path in response to said read command received through said inter-shared memory path, and transfers the read-out data to said shared memory section serving as master through said inter-shared memory path, wherein said access circuit of said shared memory section serving as master compares the read data read out of said shared memory section serving as master with the read data received from said shared memory section serving as slave, and transmits said read data and a read-out end report to said selector when both the read data coincide with each other.

* * * * *